US012591583B2

(12) United States Patent
Sakakibara et al.

(10) Patent No.: US 12,591,583 B2
(45) Date of Patent: Mar. 31, 2026

(54) SEARCH NEEDS EVALUATION PROGRAM, SEARCH NEEDS EVALUATION DEVICE AND SEARCH NEEDS EVALUATION METHOD, AND EVALUATION PROGRAM, EVALUATION DEVICE AND EVALUATION METHOD

(71) Applicant: Datascientist Inc., Tokyo (JP)

(72) Inventors: Naoya Sakakibara, Tokyo (JP); Yuki Hirobe, Tokyo (JP)

(73) Assignee: Datascientist Inc., Tokyo (JP)

( * ) Notice: Subject to any disclaimer, the term of this patent is extended or adjusted under 35 U.S.C. 154(b) by 69 days.

(21) Appl. No.: 18/775,504

(22) Filed: Jul. 17, 2024

(65) Prior Publication Data

US 2024/0370447 A1 Nov. 7, 2024

Related U.S. Application Data

(63) Continuation of application No. 18/251,639, filed as application No. PCT/JP2020/041202 on Nov. 4, 2020, now Pat. No. 12,079,228.

(51) Int. Cl.
G06F 16/2457 (2019.01)
G06F 16/26 (2019.01)
(52) U.S. Cl.
CPC ........ G06F 16/24578 (2019.01); G06F 16/26 (2019.01)
(58) Field of Classification Search
CPC ........................... G06F 16/24578; G06F 16/26
See application file for complete search history.

(56) References Cited

U.S. PATENT DOCUMENTS

2006/0224565 A1 10/2006 Ashutosh et al.
2007/0198481 A1 8/2007 Hogue et al.
(Continued)

FOREIGN PATENT DOCUMENTS

JP 2012-164242 A 8/2012
JP 2017-059184 A 3/2017
(Continued)

OTHER PUBLICATIONS

International Search Report issued in PCT/JP2020/041202; mailed Jan. 26, 2021.
(Continued)

*Primary Examiner* — Hau H Hoang
(74) *Attorney, Agent, or Firm* — Studebaker Brackett PLLC

(57) ABSTRACT

There is provided a search needs evaluation program, a search needs evaluation device, and a search needs evaluation method that present search needs of a search query in a more easy-to-understand way.

A search needs evaluation program is provided for causing a computer to function as: a search needs acquisition means configured to acquire one or more search needs included in an evaluation target search query and a degree thereof; and a display data generation means configured to generate display data for displaying the search needs included in the evaluation target search query and the degree thereof with a color bar in association with the evaluation target search query, in which one color in the color bar corresponds to one of the search needs, and an area occupied by the one color in the color bar corresponds to the degree of the search need corresponding to the color.

19 Claims, 19 Drawing Sheets

(56) References Cited

U.S. PATENT DOCUMENTS

| | | | |
|---|---|---|---|
| 2008/0244429 A1 | 10/2008 | Stading | |
| 2008/0249984 A1 | 10/2008 | Coimbatore et al. | |
| 2012/0209838 A1 | 8/2012 | Dean et al. | |
| 2018/0052905 A1 | 2/2018 | Zhicharevich et al. | |
| 2018/0089322 A1* | 3/2018 | DeLuca | G06F 16/24575 |
| 2020/0012744 A1 | 1/2020 | Shults | |
| 2021/0397662 A1 | 12/2021 | Sakakibara et al. | |
| 2022/0318854 A1 | 10/2022 | Sakakibara et al. | |

FOREIGN PATENT DOCUMENTS

| | | | |
|---|---|---|---|
| JP | 2017-146926 A | 8/2017 | |
| JP | 6680956 B1 | 4/2020 | |

OTHER PUBLICATIONS

Hirose, Masayuki et al., Detecting Peculiar Web Pages Based on Visualization Using Words Web Frequency and Topic Probabilistic Model, SIG-KBS-A405, Japanese Society for Artificial Intelligence, Feb. 25, 2005, pp. 69-74.

"Notice of Reasons for Refusal" Office Action issued in JP 2022-552383; mailed by the Japanese Patent Office on Nov. 29, 2022.

"Notice of Reasons for Refusal" Office Action issued in JP 2022-149753; mailed by the Japanese Patent Office on Dec. 6, 2022.

"Decision to Grant a Patent" Office Action issued in JP 2022-552383; mailed by the Japanese Patent Office on Mar. 14, 2023.

"Decision to Grant a Patent" Office Action issued in JP 2022-149753; mailed by the Japanese Patent Office on Mar. 14, 2023.

* cited by examiner

FIG. 2

SEARCH QUERY: storage

NUMBER OF SEARCHES: 2,000/MONTH

| SEARCH RESULT | NUMBER OF INFLOWS/ MONTH |
|---|---|
| W1 | 600 |
| W2 | 500 |
| W3 | 400 |
| W4 | 300 |
| W5 | 150 |
| W6 | 50 |

WAREHOUSE FACILITY                    TOTAL NUMBER OF INFLOWS

G1

| W1 (600) | W3 (400) | W4 (300) |

1,300 (65%)

STORAGE FURNITURE

G2

| W2 (500) | W6 (50) |

550 (27.5%)

DATA STORAGE MEANS

G3

| W5 (150) |

150 (7.5%)

| SEARCH QUERY | NUMBER OF SEARCHES | WAREHOUSE FACILITY | STORAGE FURNITURE | DATA STORAGE MEANS |
|---|---|---|---|---|
| storage | 2,000 | 1300 (65%) | 550 (27.5%) | 150 (7.5%) |
| storage near me | 1,500 | 1,500 (100%) | 0 (0%) | 0 (0%) |
| data storage | 800 | 0 (0%) | 0 (0%) | 800 (100%) |

FIG. 4A

| SEARCH QUERY | NUMBER OF SEARCHES | NEEDS PURITY |
|---|---|---|
| storage | 2,000 | 0.72 |
| storage near me | 1,500 | 1.00 |
| data storage | 800 | 1.00 |

SEARCH NEEDS

C1
C2
C3

WAREHOUSE FACILITY
STORAGE FURNITURE
DATA STORAGE MEANS

FIG. 4B

| SEARCH QUERY | NUMBER OF SEARCHES | NEEDS PURITY |
|---|---|---|
| storage | 368,000 | 0.72 |
| storage near me | 165,000 | 1.00 |
| storage sheds | 110,000 | 0.90 |
| cube storage | 74,000 | 0.93 |
| storage bins | 49,500 | 1.00 |
| storage boxes | 27,100 | 1.00 |
| mini storage | 14,800 | 1.00 |
| storage solutions | 9,900 | 0.81 |
| san storage | 2,400 | 1.00 |
| data storage | 2,400 | 1.00 |

WAREHOUSE FACILITY
STORAGE FURNITURE
DATA STORAGE MEANS

FIG. 5A

| SEARCH QUERY | NUMBER OF SEARCHES | NEEDS PURITY | |
|---|---|---|---|
| storage | 368,000 | 0.72 | |
| storage near me | 165,000 | 1.00 | |
| storage sheds | 110,000 | 0.90 | |
| cube storage | 74,000 | 0.93 | |
| storage bins | 49,500 | 1.00 | |
| storage boxes | 27,100 | 1.00 | |
| mini storage | 14,800 | 1.00 | |
| storage solutions | 9,900 | 0.81 | |
| san storage | 2,400 | 1.00 | |
| data storage | 2,400 | 1.00 | |

DISPLAY ONLY SEARCH QUERY INCLUDING THIS SEARCH NEED

OK

▢ WAREHOUSE FACILITY
▨ STORAGE FURNITURE
▩ DATA STORAGE MEANS

FIG. 5B

| SEARCH QUERY | NUMBER OF SEARCHES | NEEDS PURITY | |
|---|---|---|---|
| storage | 368,000 | 0.72 | |
| storage near me | 165,000 | 1.00 | |
| storage sheds | 110,000 | 0.90 | |
| cube storage | 74,000 | 0.93 | |
| mini storage | 14,800 | 1.00 | |
| storage solutions | 9,900 | 0.81 | |

▢ WAREHOUSE FACILITY
▨ STORAGE FURNITURE
▩ DATA STORAGE MEANS

FIG. 6A

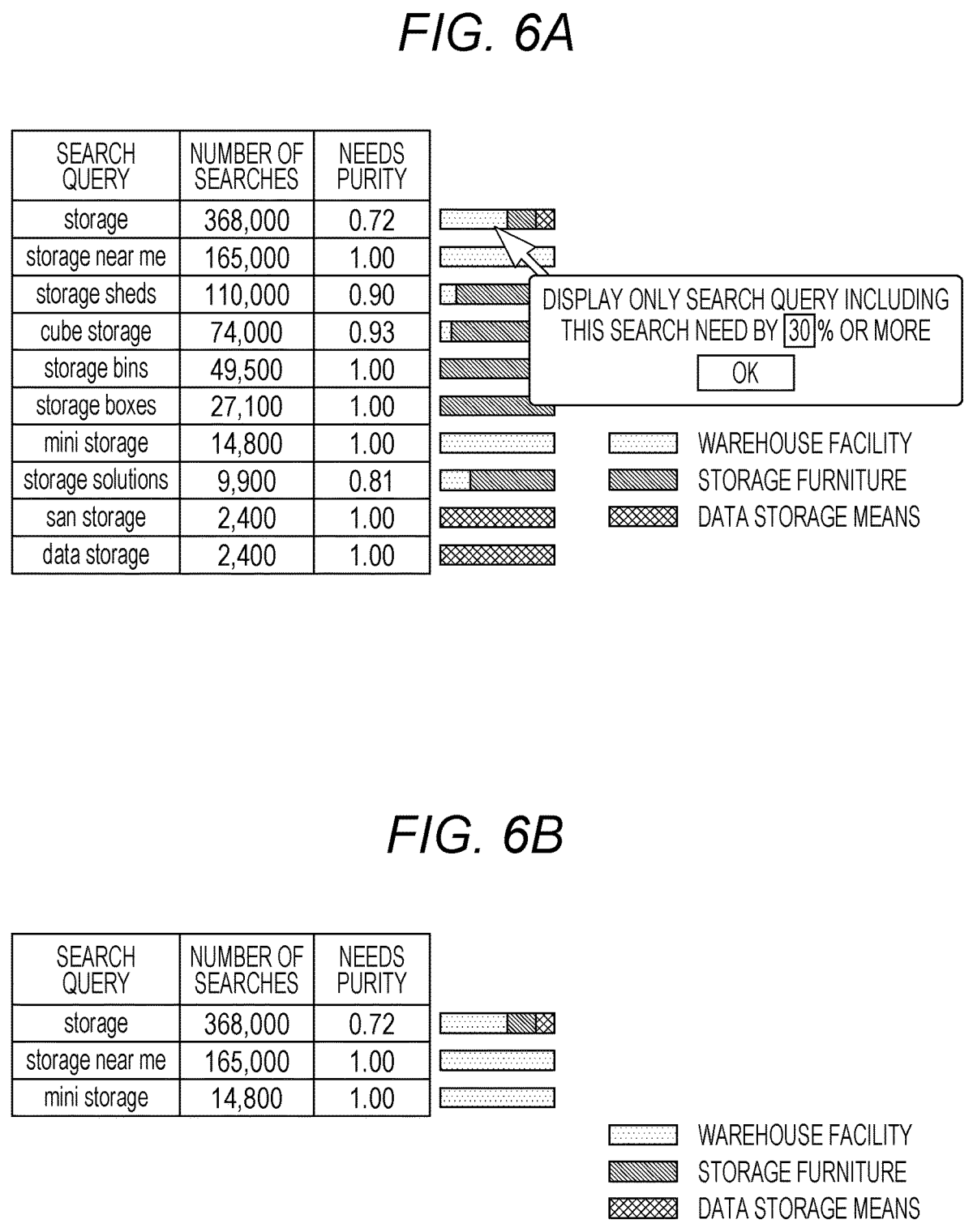

| SEARCH QUERY | NUMBER OF SEARCHES | NEEDS PURITY | |
|---|---|---|---|
| storage | 368,000 | 0.72 | |
| storage near me | 165,000 | 1.00 | |
| storage sheds | 110,000 | 0.90 | |
| cube storage | 74,000 | 0.93 | |
| storage bins | 49,500 | 1.00 | |
| storage boxes | 27,100 | 1.00 | |
| mini storage | 14,800 | 1.00 | |
| storage solutions | 9,900 | 0.81 | |
| san storage | 2,400 | 1.00 | |
| data storage | 2,400 | 1.00 | |

DISPLAY ONLY SEARCH QUERY INCLUDING THIS SEARCH NEED BY [30]% OR MORE

OK

WAREHOUSE FACILITY
STORAGE FURNITURE
DATA STORAGE MEANS

FIG. 6B

| SEARCH QUERY | NUMBER OF SEARCHES | NEEDS PURITY | |
|---|---|---|---|
| storage | 368,000 | 0.72 | |
| storage near me | 165,000 | 1.00 | |
| mini storage | 14,800 | 1.00 | |

WAREHOUSE FACILITY
STORAGE FURNITURE
DATA STORAGE MEANS

FIG. 7A

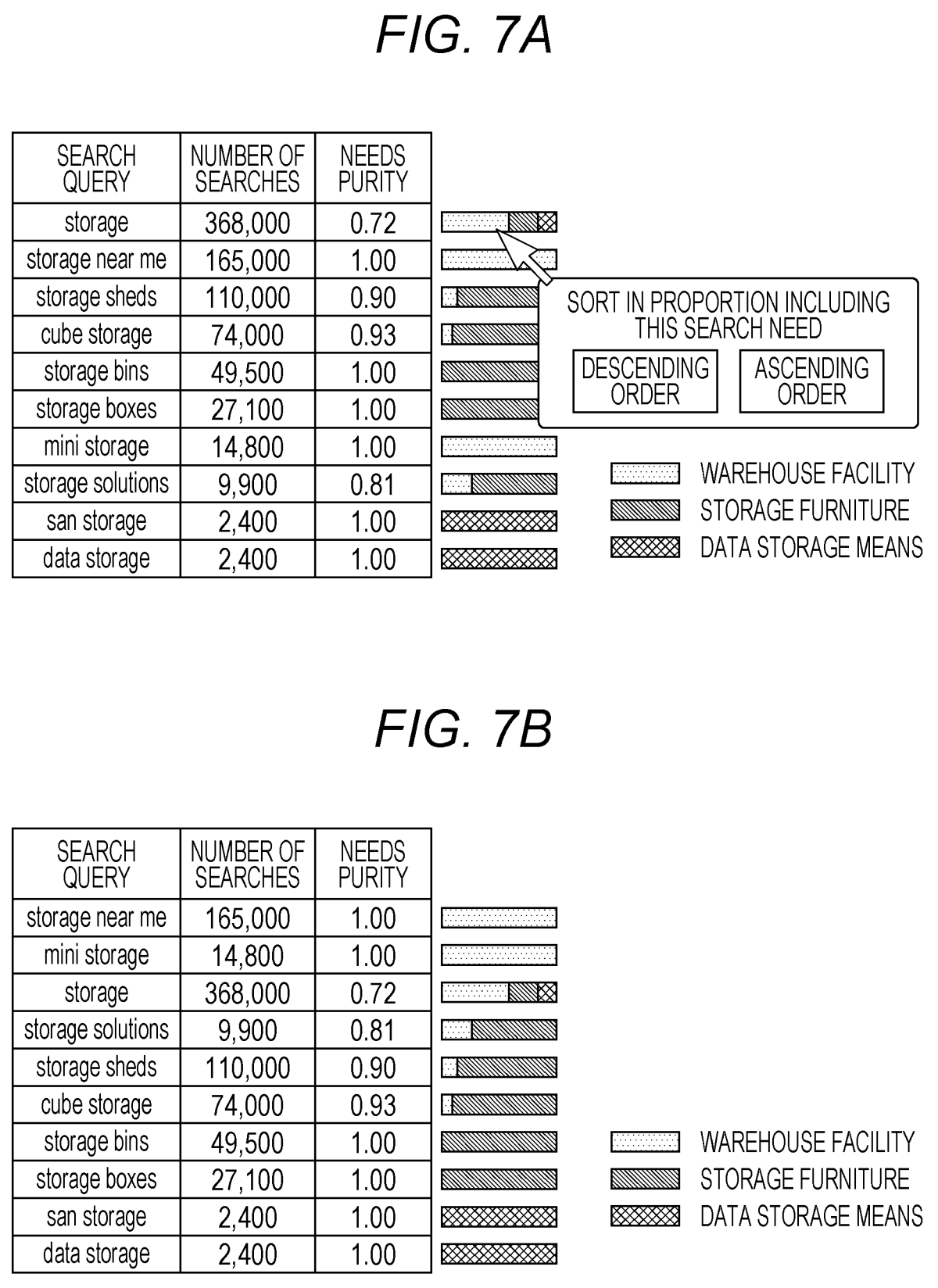

| SEARCH QUERY | NUMBER OF SEARCHES | NEEDS PURITY | |
|---|---|---|---|
| storage | 368,000 | 0.72 | |
| storage near me | 165,000 | 1.00 | |
| storage sheds | 110,000 | 0.90 | |
| cube storage | 74,000 | 0.93 | |
| storage bins | 49,500 | 1.00 | |
| storage boxes | 27,100 | 1.00 | |
| mini storage | 14,800 | 1.00 | |
| storage solutions | 9,900 | 0.81 | |
| san storage | 2,400 | 1.00 | |
| data storage | 2,400 | 1.00 | |

SORT IN PROPORTION INCLUDING THIS SEARCH NEED

| DESCENDING ORDER | ASCENDING ORDER |

WAREHOUSE FACILITY
STORAGE FURNITURE
DATA STORAGE MEANS

FIG. 7B

| SEARCH QUERY | NUMBER OF SEARCHES | NEEDS PURITY | |
|---|---|---|---|
| storage near me | 165,000 | 1.00 | |
| mini storage | 14,800 | 1.00 | |
| storage | 368,000 | 0.72 | |
| storage solutions | 9,900 | 0.81 | |
| storage sheds | 110,000 | 0.90 | |
| cube storage | 74,000 | 0.93 | |
| storage bins | 49,500 | 1.00 | |
| storage boxes | 27,100 | 1.00 | |
| san storage | 2,400 | 1.00 | |
| data storage | 2,400 | 1.00 | |

WAREHOUSE FACILITY
STORAGE FURNITURE
DATA STORAGE MEANS

FIG. 8

| SEARCH QUERY | NUMBER OF SEARCHES | NEEDS PURITY |
|---|---|---|
| storage | 368,000 | 0.72 |
| storage near me | 165,000 | 1.00 |
| storage sheds | 110,000 | 0.90 |
| cube storage | 74,000 | 0.93 |
| storage bins | 49,500 | 1.00 |
| storage boxes | 27,100 | 1.00 |
| mini storage | 14,800 | 1.00 |
| storage solutions | 9,900 | 0.81 |
| san storage | 2,400 | 1.00 |
| data storage | 2,400 | 1.00 |

L1

WAREHOUSE FACILITY
STORAGE FURNITURE
DATA STORAGE MEANS

FIG. 9A

| SEARCH QUERY | NUMBER OF SEARCHES | NEEDS PURITY |
|---|---|---|
| storage | 368,000 | 0.72 |
| storage near me | 165,000 | 1.00 |
| storage sheds | 110,000 | 0.90 |
| cube storage | 74,000 | 0.93 |
| storage bins | 49,500 | 1.00 |
| storage boxes | 27,100 | 1.00 |
| mini storage | 14,800 | 1.00 |
| storage solutions | 9,900 | 0.81 |
| san storage | 2,400 | 1.00 |
| data storage | 2,400 | 1.00 |

DISPLAY ONLY SEARCH QUERY WITH
NUMBER OF INFLOWS OF THIS SEARCH NEED
50,000 /MONTH OR MORE
OK

WAREHOUSE FACILITY
STORAGE FURNITURE
DATA STORAGE MEANS

*FIG. 9B*

| SEARCH QUERY | NUMBER OF SEARCHES | NEEDS PURITY |
|---|---|---|
| storage | 368,000 | 0.72 |
| storage near me | 165,000 | 1.00 |

WAREHOUSE FACILITY

STORAGE FURNITURE

DATA STORAGE MEANS

*FIG. 10* storage warehousing data storage

WAREHOUSE FACILITY

STORAGE FURNITURE

DATA STORAGE MEANS

FIG. 11

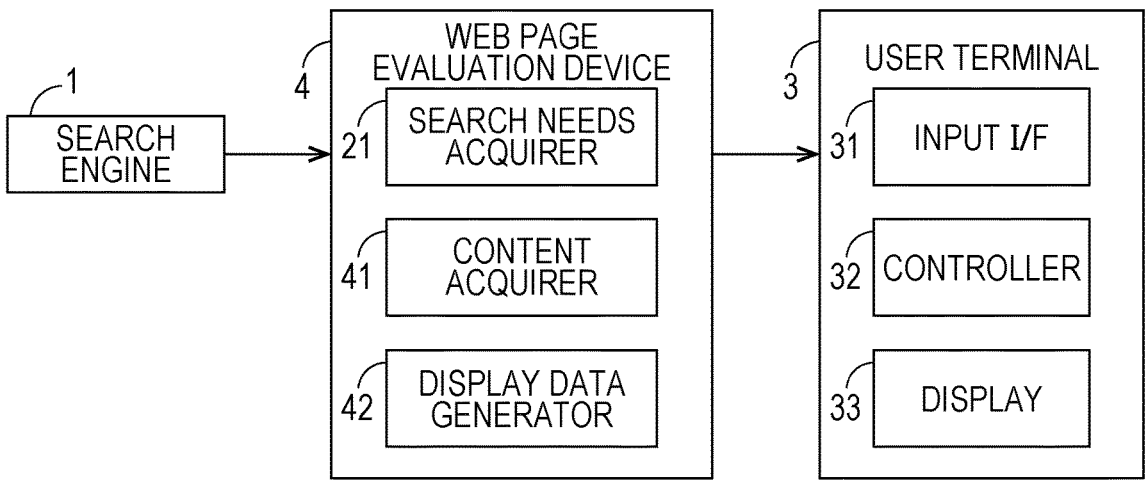

FIG. 12A

CONTENT INCLUDED IN WEB PAGE AND DEGREE THEREOF

| EVALUATION TARGET WEB PAGE | WAREHOUSE FACILITY | STORAGE FURNITURE | DATA STORAGE MEANS | |
|---|---|---|---|---|
| a.com/index.html | 80% | 15% | 5% | |
| b.com/index.html | 60% | 20% | 20% | |
| c.com/index.html | 0% | 0% | 100% | |

WAREHOUSE FACILITY
STORAGE FURNITURE
DATA STORAGE MEANS

FIG. 12B

SEARCH RESULT

| SEARCH QUERY | 1st PLACE | 2nd PLACE | 3rd PLACE |
|---|---|---|---|
| storage | a.com/index.html | b.com/index.html | *** |
| storage near me | a.com/index.html | *** | *** |
| data storage | c.com/index.html | *** | *** |

FIG. 13A

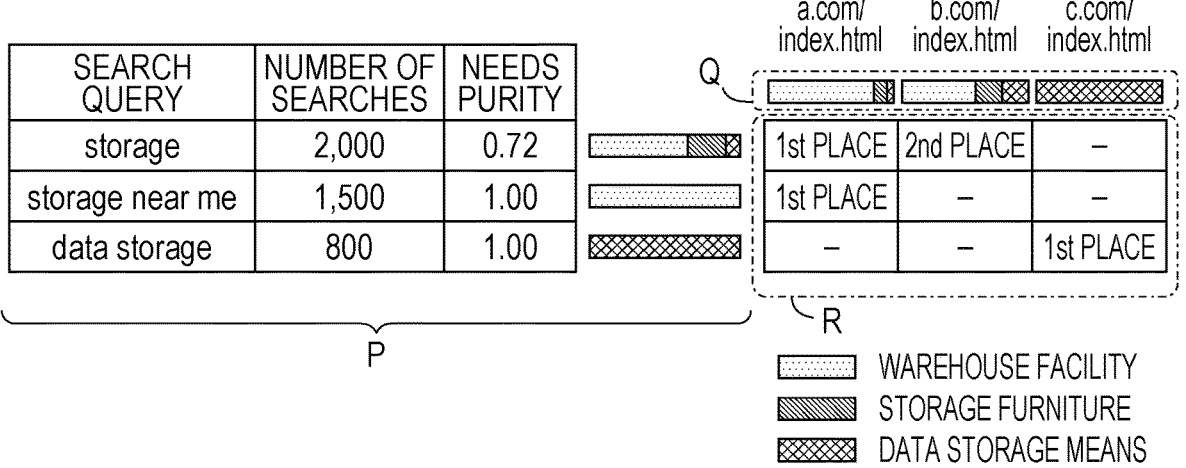

| SEARCH QUERY | NUMBER OF SEARCHES | NEEDS PURITY | | a.com/ index.html | b.com/ index.html | c.com/ index.html |
|---|---|---|---|---|---|---|
| storage | 2,000 | 0.72 | | 1st PLACE | 2nd PLACE | – |
| storage near me | 1,500 | 1.00 | | 1st PLACE | – | – |
| data storage | 800 | 1.00 | | – | – | 1st PLACE |

P

Q

R

▦ WAREHOUSE FACILITY
▨ STORAGE FURNITURE
▩ DATA STORAGE MEANS

FIG. 13B

| SEARCH QUERY | NUMBER OF SEARCHES | NEEDS PURITY | | a.com/ index.html | b.com/ index.html | c.com/ index.html |
|---|---|---|---|---|---|---|
| storage | 368,000 | 0.72 | | 1st PLACE | 2nd PLACE | - |
| storage near me | 165,000 | 1.00 | | 1st PLACE | 4th PLACE | - |
| storage sheds | 110,000 | 0.90 | | - | 1st PLACE | - |
| cube storage | 74,000 | 0.93 | | 9th PLACE | 2nd PLACE | - |
| storage bins | 49,500 | 1.00 | | - | 1st PLACE | - |
| storage boxes | 27,100 | 1.00 | | 8th PLACE | 1st PLACE | - |
| mini storage | 14,800 | 1.00 | | 1st PLACE | 5th PLACE | - |
| storage solutions | 9,900 | 0.81 | | 4th PLACE | 1st PLACE | - |
| san storage | 2,400 | 1.00 | | - | - | 3rd PLACE |
| data storage | 2,400 | 1.00 | | - | 6th PLACE | 1st PLACE |

▦ WAREHOUSE FACILITY
▨ STORAGE FURNITURE
▩ DATA STORAGE MEANS

FIG. 14A

| SEARCH QUERY | NUMBER OF SEARCHES | NEEDS PURITY | | a.com/ index.html | b.com/ index.html | c.com/ index.html |
|---|---|---|---|---|---|---|
| storage | 368,000 | 0.72 | | 1st PL͞CE | 3rd PLACE | |
| storage near me | 165,000 | 1.00 | | 1st PL | | |
| storage sheds | 110,000 | 0.90 | | - | | |
| cube storage | 74,000 | 0.93 | | 9th PLACE | 2nd PLACE | |
| storage bins | 49,500 | 1.00 | | - | 1st PLACE | - |
| storage boxes | 27,100 | 1.00 | | 8th PLACE | 1st PLACE | - |
| mini storage | 14,800 | 1.00 | | 1st PLACE | 5th PLACE | - |
| storage solutions | 9,900 | 0.81 | | 4th PLACE | 1st PLACE | - |
| san storage | 2,400 | 1.00 | | - | - | 3rd PLACE |
| data storage | 2,400 | 1.00 | | - | 6th PLACE | 1st PLACE |

DISPLAY ONLY SITE INCLUDING THIS CONTENT

OK

▨ WAREHOUSE FACILITY
▨ STORAGE FURNITURE
▨ DATA STORAGE MEANS

FIG. 14B

| SEARCH QUERY | NUMBER OF SEARCHES | NEEDS PURITY | | a.com/ index.html | b.com/ index.html |
|---|---|---|---|---|---|
| storage | 368,000 | 0.72 | | 1st PLACE | 2nd PLACE |
| storage near me | 165,000 | 1.00 | | 1st PLACE | 4th PLACE |
| storage sheds | 110,000 | 0.90 | | - | 1st PLACE |
| cube storage | 74,000 | 0.93 | | 9th PLACE | 2nd PLACE |
| storage bins | 49,500 | 1.00 | | - | 1st PLACE |
| storage boxes | 27,100 | 1.00 | | 8th PLACE | 1st PLACE |
| mini storage | 14,800 | 1.00 | | 1st PLACE | 5th PLACE |
| storage solutions | 9,900 | 0.81 | | 4th PLACE | 1st PLACE |
| san storage | 2,400 | 1.00 | | - | - |
| data storage | 2,400 | 1.00 | | - | 6th PLACE |

▨ WAREHOUSE FACILITY
▨ STORAGE FURNITURE
▨ DATA STORAGE MEANS

FIG. 15A

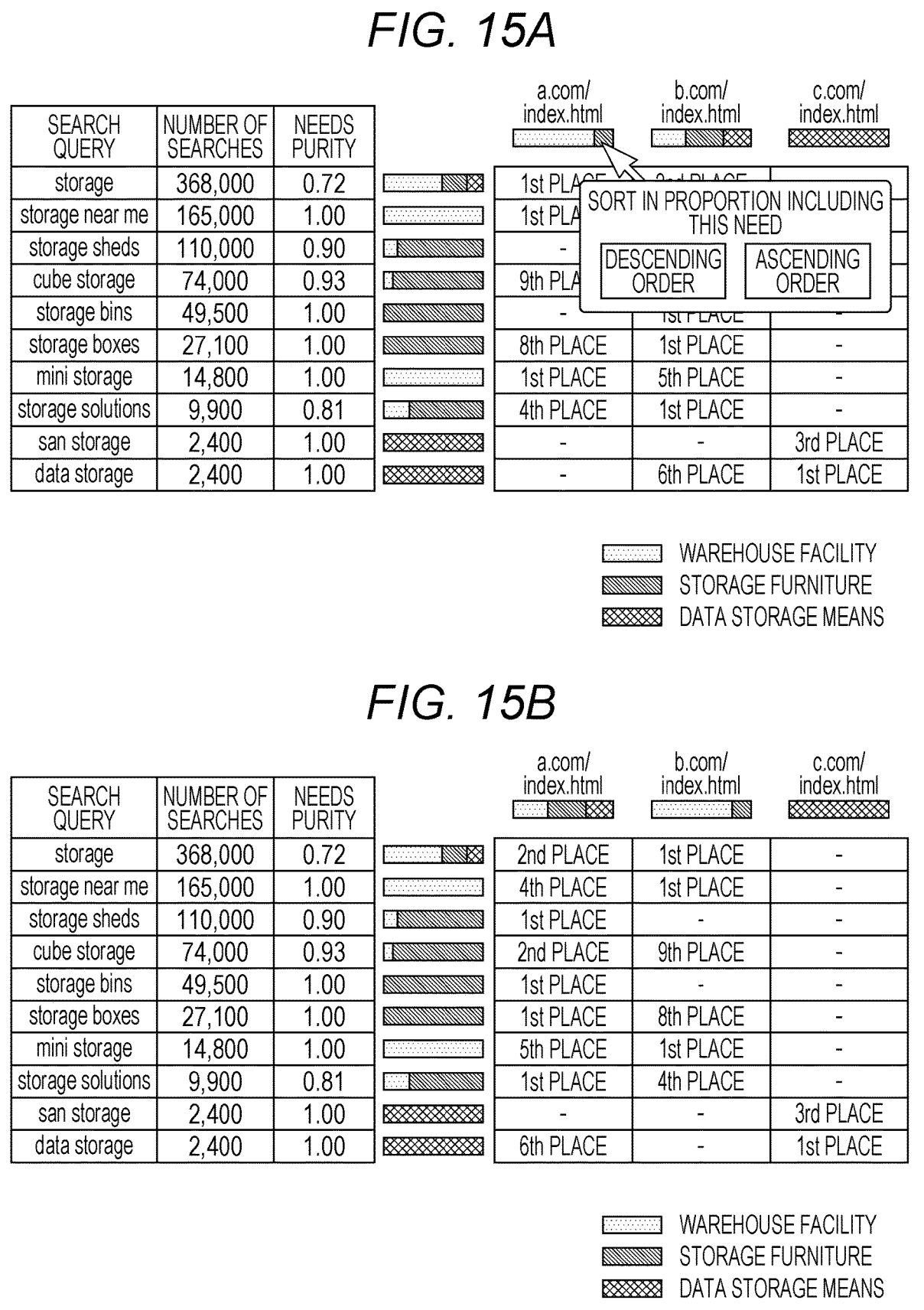

| SEARCH QUERY | NUMBER OF SEARCHES | NEEDS PURITY | | a.com/ index.html | b.com/ index.html | c.com/ index.html |
|---|---|---|---|---|---|---|
| storage | 368,000 | 0.72 | | 1st PLA... | | |
| storage near me | 165,000 | 1.00 | | 1st PLA... | | |
| storage sheds | 110,000 | 0.90 | | - | | |
| cube storage | 74,000 | 0.93 | | 9th PLA... | | |
| storage bins | 49,500 | 1.00 | | - | 1st PLACE | - |
| storage boxes | 27,100 | 1.00 | | 8th PLACE | 1st PLACE | - |
| mini storage | 14,800 | 1.00 | | 1st PLACE | 5th PLACE | - |
| storage solutions | 9,900 | 0.81 | | 4th PLACE | 1st PLACE | - |
| san storage | 2,400 | 1.00 | | - | - | 3rd PLACE |
| data storage | 2,400 | 1.00 | | - | 6th PLACE | 1st PLACE |

SORT IN PROPORTION INCLUDING THIS NEED

DESCENDING ORDER    ASCENDING ORDER

WAREHOUSE FACILITY
STORAGE FURNITURE
DATA STORAGE MEANS

FIG. 15B

| SEARCH QUERY | NUMBER OF SEARCHES | NEEDS PURITY | | a.com/ index.html | b.com/ index.html | c.com/ index.html |
|---|---|---|---|---|---|---|
| storage | 368,000 | 0.72 | | 2nd PLACE | 1st PLACE | - |
| storage near me | 165,000 | 1.00 | | 4th PLACE | 1st PLACE | - |
| storage sheds | 110,000 | 0.90 | | 1st PLACE | - | - |
| cube storage | 74,000 | 0.93 | | 2nd PLACE | 9th PLACE | - |
| storage bins | 49,500 | 1.00 | | 1st PLACE | - | - |
| storage boxes | 27,100 | 1.00 | | 1st PLACE | 8th PLACE | - |
| mini storage | 14,800 | 1.00 | | 5th PLACE | 1st PLACE | - |
| storage solutions | 9,900 | 0.81 | | 1st PLACE | 4th PLACE | - |
| san storage | 2,400 | 1.00 | | - | - | 3rd PLACE |
| data storage | 2,400 | 1.00 | | 6th PLACE | - | 1st PLACE |

WAREHOUSE FACILITY
STORAGE FURNITURE
DATA STORAGE MEANS

CONTENT OF RESPECTIVE WEB PAGES AND DEGREE THEREOF

| DOMAIN | WEB PAGE | WAREHOUSE FACILITY | STORAGE FURNITURE | DATA STORAGE MEANS | NUMBER OF INFLOWS v |
|---|---|---|---|---|---|
| a.com | a.com/home.html | 100% | 0% | 0% | 150 |
| | a.com/storage.html | 80% | 15.7% | 4.3% | 30 |
| b.com | b.com/home.html | 65% | 27.5% | 7.5% | 100 |
| c.com | c.com/data.html | 0% | 0% | 100% | 50 |
| | c.com/home.html | 100% | 0% | 0% | 60 |

FIG. 18

| DOMAIN | WAREHOUSE FACILITY | STORAGE FURNITURE | DATA STORAGE MEANS |
|---|---|---|---|
| a.com | 174 (96.7%) | 4.71 (2.6%) | 1.29 (0.7%) |
| b.com | 65 (65%) | 27.5 (27.5%) | 7.5 (7.5) |
| c.com | 60 (54.5%) | 0 (0%) | 50 (45.5%) |

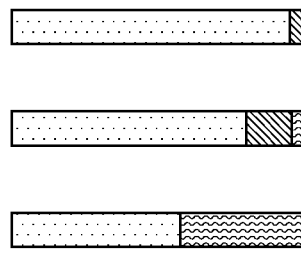

FIG. 19

SEARCH RESULT

| SEARCH QUERY | 1st PLACE | 2nd PLACE | 3rd PLACE |
|---|---|---|---|
| storage | a.com/index.html | b.com/index.html | *** |
| storage near me | a.com/index.html | *** | *** |
| data storage | c.com/index.html | *** | *** |

FIG. 20

SEARCH NEEDS OF RESPECTIVE SEARCH QUERIES
AND TOTAL NUMBER OF INFLOWS (DEGREE)

| SEARCH QUERY | WAREHOUSE FACILITY | STORAGE FURNITURE | DATA STORAGE MEANS |
|---|---|---|---|
| storage | 1,300 | 550 | 150 |
| storage near me | 1,500 | 0 | 0 |
| data storage | 0 | 0 | 800 |

FIG. 21

CONTENT OF RESPECTIVE WEB PAGES AND DEGREE THEREOF

| | WAREHOUSE FACILITY | STORAGE FURNITURE | DATA STORAGE MEANS |
|---|---|---|---|
| a.com/index.html | 2800 (80.0%) | 550 (15.7%) | 150 (4.3%) |
| b.com/index.html | 1300 (65%) | 550 (27.5%) | 150 (7.5%) |
| c.com/index.html | 0 (0%) | 0 (0%) | 800 (100%) |

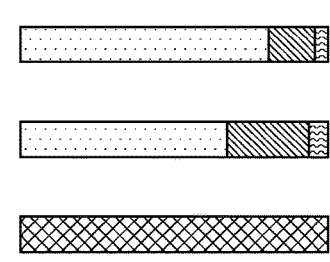

▨ WAREHOUSE FACILITY
▨ STORAGE FURNITURE
▨ DATA STORAGE MEANS

FIG. 22

| SEARCH QUERY | NUMBER OF SEARCHES | NEEDS PURITY | | a.com | b.com | c.com |
|---|---|---|---|---|---|---|
| storage | 2,000 | 0.72 | | 1st PLACE | 2nd PLACE | – |
| storage near me | 1,500 | 1.00 | | 1st PLACE | 5th PLACE | – |
| data storage | 800 | 1.00 | | – | 8th PLACE | 1st PLACE |

▨ WAREHOUSE FACILITY
▨ STORAGE FURNITURE
▨ DATA STORAGE MEANS

FIG. 23

SEARCH RESULT

| SEARCH QUERY | 1st PLACE | 2nd PLACE | 3rd PLACE | 4th PLACE |
|---|---|---|---|---|
| storage | a.com/storage | b.com | *** | *** |
| storage near me | a.com/home | a.com/storage | c.com/home | *** |
| data storage | c.com/data | *** | *** | *** |

FIG. 24

CONTENT OF RESPECTIVE WEB PAGES AND DEGREE THEREOF

| | WAREHOUSE FACILITY | STORAGE FURNITURE | DATA STORAGE MEANS | |
|---|---|---|---|---|
| a.com/home | 1,500 (100%) | 0 (0%) | 0 (0%) | |
| a.com/storage | 2,800 (80.0%) | 550 (15.7%) | 150 (4.3%) | |
| b.com | 1,300 (65%) | 550 (15.7%) | 150 (7.5%) | |
| c.com/data | 0 (0%) | 0 (0%) | 800 (100%) | |
| c.com/home | 1,500 (100%) | 0 (0%) | 0 (0%) | |

▢ WAREHOUSE FACILITY
▨ STORAGE FURNITURE
▩ DATA STORAGE MEANS

FIG. 25

CONTENT OF RESPECTIVE DOMAINS AND DEGREE THEREOF

| | WAREHOUSE FACILITY | STORAGE FURNITURE | DATA STORAGE MEANS | |
|---|---|---|---|---|
| a.com | 4.300 (86.6%) | 550 (11.0%) | 150 (3.0%) | |
| b.com | 1,300 (65%) | 550 (27.5%) | 150 (7.5%) | |
| c.com | 1,500 (100%) | 0 (0%) | 0 (0%) | |

▢ WAREHOUSE FACILITY
▨ STORAGE FURNITURE
▩ DATA STORAGE MEANS

TARGET SEARCH QUERY: AI

|  | 1st PLACE W1 | 2nd PLACE W2 |
|---|---|---|
| ARTIFICIAL INTELLIGENCE | 5 | 1 |
| intelligence | 4 | 0 |
| CONCERT | 1 | 4 |

⬚ ARTIFICIAL INTELLIGENCE
▨ SINGER

TARGET SEARCH QUERY: storage

|  | 1st PLACE W1 | 2nd PLACE W2 |
|---|---|---|
| storage | 5 | 3 |
| address | 4 | 0 |
| TB | 0 | 10 |

⬚ WAREHOUSE FACILITY
▨ DATA STORAGE MEANS

|  | ARTIFICIAL INTELLIGENCE | SINGER |
|---|---|---|
| ARTIFICIAL INTELLIGENCE | 4.85 (80.8%) | 1.15 (19.1%) |
| intelligence | 3.8 (95%) | 0.2 (5%) |
| CONCERT | 1.35 (27%) | 3.65 (73%) |

| | ARTIFICIAL INTELLIGENCE | SINGER |
|---|---|---|
| ARTIFICIAL INTELLIGENCE | 5.05 (63.1%) | 2.95 (36.9%) |
| intelligence | 3.8 (95%) | 0.2 (5%) |
| CONCERT | 1.0 (10%) | 3.65 (90%) |

SEARCH NEEDS EVALUATION PROGRAM, SEARCH NEEDS EVALUATION DEVICE AND SEARCH NEEDS EVALUATION METHOD, AND EVALUATION PROGRAM, EVALUATION DEVICE AND EVALUATION METHOD

CROSS-REFERENCE TO RELATED APPLICATIONS

This application is a continuation of U.S. patent application Ser. No. 18/251,639 Filed May 3, 2023, which is the U.S. National Stage of International Application No. PCT/JP2020/041202 filed Nov. 4, 2020, the entire contents of which are incorporated herein by reference.

TECHNICAL FIELD

The present invention relates to a search needs evaluation program, a search needs evaluation device and a search needs evaluation method, an evaluation program, an evaluation device and an evaluation method.

BACKGROUND ART

A search needs evaluation device is known to acquire similarity of search needs between one search word and another search word (Patent Literature 2) by using the fact that the search needs of the search word are reflected on search results for the search word (for example, Patent Literature 1).

CITATION LIST

Patent Literature

Patent Literature 1: United States Patent No. 2012/0209838
Patent Literature 2: Japanese Patent No. 6680956

SUMMARY OF INVENTION

Technical Problem

One object of the present invention is to provide a search needs evaluation program, a search needs evaluation device, and a search needs evaluation method that present search needs of a search query in a more easy-to-understand way.

Another object of the present invention is to provide an evaluation program, an evaluation device, and an evaluation method that present evaluations of a web page, website, and the like in an easy-to-understand way.

Solution to Problem

According to one aspect, a search needs evaluation program is provided for causing a computer to function as: a search needs acquisition means configured to acquire one or more search needs included in an evaluation target search query and a degree thereof; and a display data generation means configured to generate display data for displaying the search needs included in the evaluation target search query and the degree thereof as a color bar in association with the evaluation target search query, in which one color in the color bar corresponds to one of the search needs, and an area occupied by the one color in the color bar corresponds to the degree of the search need corresponding to the color.

A total area of the color bar may correspond to a number of searches, a number of inflows, or economic scale of the evaluation target search query.

There may be a plurality of the evaluation target search queries, and in response to a user operation, the display data generation means may generate: first display data for displaying the search needs and the degree thereof for all the evaluation target search queries, or second display data for displaying the search needs and the degree thereof for only part of the plurality of evaluation target search queries according to designation from the user.

There may be a plurality of the evaluation target search queries, and the display data generation means may generate display data for displaying the search needs included in each of the evaluation target search queries and the degree thereof in order according to designation from a user in association with each of the plurality of evaluation target search queries.

According to one aspect, a search needs evaluation program is provided for causing a computer to function as: a search needs acquisition means configured to acquire one or more search needs included in each of a plurality of evaluation target search queries and a degree thereof; and a display data generation means configured to generate display data for displaying the search needs included in each of the evaluation target search queries and the degree thereof in association with each of the plurality of evaluation target search queries, in which in response to a user operation, the display data generation means generates: first display data for displaying the search needs and the degree thereof for all the evaluation target search queries, or second display data for displaying the search needs and the degree thereof for only part of the plurality of evaluation target search queries according to designation from the user.

The display data generation means may generate the second display data for displaying the search needs and the degree thereof for only the evaluation target search query identified based on the search needs designated by the user out of the plurality of evaluation target search queries.

The display data generation means may generate the second display data for displaying the search need and the degree thereof for only the evaluation target search query identified based on the search needs designated by the user and the degree thereof out of the plurality of evaluation target search queries.

According to one aspect, a search needs evaluation program is provided for causing a computer to function as: a search needs acquisition means configured to acquire one or more search needs included in each of a plurality of evaluation target search queries and a degree thereof; and a display data generation means configured to generate display data for displaying the search needs included in each of the evaluation target search queries and the degree thereof in association with each of the plurality of evaluation target search queries in order according to designation from a user.

The display data may include information indicating a number of searches, a number of inflows, or the degree of the evaluation target search query.

The search needs acquisition means may acquire the one or more search needs included in the evaluation target search query and the degree thereof by using a fact that the search needs of the search query is reflected in a search result for the search query.

The search needs acquisition means may classify web pages in the search result for the evaluation target search query into one or more subsets each corresponding to one of the search needs, and a total value of a number of inflows of the web pages classified into the subsets may correspond to the degree of the search need corresponding to the subset.

According to one aspect, a search needs evaluation program is provided for causing a computer to function as: a search needs acquisition means configured to acquire one or more search needs included in each of a plurality of search queries in a search query group and a degree thereof; and a display data generation means configured to generate display data by acquiring the search needs included in the search query group and the degree thereof for display in association with the search query group based on the search needs included in the plurality of search queries and the degree thereof.

The display data generation means may acquire the degree of each of the search needs included in the search query group by weighting and adding the degree of the search needs included in each of the plurality of search queries according to the number of inflows of the search query or economic scale.

According to one aspect, a search needs evaluation device is provided including: a search needs acquisition means configured to acquire one or more search needs included in an evaluation target search query and a degree thereof; and a display data generation means configured to generate display data for displaying the search needs included in the evaluation target search query and the degree thereof as a color bar in association with the evaluation target search query, in which one color in the color bar corresponds to one of the search needs, and an area occupied by the one color in the color bar corresponds to the degree of the search need corresponding to the color.

According to one aspect, a search needs evaluation method is provided including the steps of: acquiring, by a search needs acquisition means, one or more search needs included in an evaluation target search query and a degree thereof; and generating, by a display data generation means, display data for displaying the search needs included in the evaluation target search query and the degree thereof as a color bar in association with the evaluation target search query, in which one color in the color bar corresponds to one of the search needs, and an area occupied by the one color in the color bar corresponds to the degree of the search need corresponding to the color.

According to one aspect, a search needs evaluation method is provided including: a search needs acquisition means configured to acquire one or more search needs included in each of a plurality of evaluation target search queries and a degree thereof; and a display data generation means configured to generate display data for displaying the search needs included in each of the evaluation target search queries and the degree thereof in association with each of the plurality of evaluation target search queries, in which in response to a user operation, the display data generation means generates: first display data for displaying the search needs and the degree thereof for all the evaluation target search queries, or second display data for displaying the search needs and the degree thereof for only part of the plurality of evaluation target search queries according to designation from the user.

According to one aspect, a search needs evaluation method is provided including the steps of: acquiring, by a search needs acquisition means, one or more search needs included in each of a plurality of evaluation target search queries and a degree thereof; and generating, by a display data generation means, display data for displaying the search needs included in each of the evaluation target search queries and the degree thereof in association with each of the plurality of evaluation target search queries, in which in response to a user operation, the display data generation means generates: first display data for displaying the search needs and the degree thereof for all the evaluation target search queries, or second display data for displaying the search needs and the degree thereof for only part of the plurality of evaluation target search queries according to designation from the user.

According to one aspect, a search needs evaluation device is provided including: a search needs acquisition means configured to acquire one or more search needs included in each of a plurality of evaluation target search queries and a degree thereof; and a display data generation means configured to generate display data for displaying the search needs included in each of the evaluation target search queries and the degree thereof in association with each of the plurality of evaluation target search queries in order according to designation from a user.

According to one aspect, a search needs evaluation method is provided including the steps of: acquiring, by a search needs acquisition means, one or more search needs included in each of a plurality of evaluation target search queries and a degree thereof; and generating, by a display data generation means, display data for displaying the search needs included in each of the evaluation target search queries and the degree thereof in association with each of the plurality of evaluation target search queries in order according to designation from a user.

According to one aspect, a search needs evaluation device is provided including: a search needs acquisition means configured to acquire one or more search needs included in each of a plurality of search queries in a search query group and a degree thereof; and a display data generation means configured to generate display data for acquiring the search needs included in the search query group and the degree thereof for display in association with the search query group based on the search needs included in the plurality of search queries and the degree thereof.

According to one aspect, a search needs evaluation method is provided including the steps of: acquiring, by a search needs acquisition means, one or more search needs included in each of a plurality of search queries in a search query group and a degree thereof; and generating, by a display data generation means, display data for acquiring the search needs included in the search query group and the degree thereof for display in association with the search query group based on the search needs included in the plurality of search queries and the degree thereof.

According to one aspect, an evaluation program is provided for causing a computer to function as: a content acquisition means configured to acquire one or more pieces of content contained in an evaluation target web page that is an evaluation target unit and a degree thereof; and a display data generation means configured to generate display data for displaying the content of the evaluation target web page and the degree thereof in association with the evaluation target web page.

The display data generation means may display a search query associated with the evaluation target web page and display ranking of the evaluation target web page in a search result for the search query in association with each other.

The display data generation means may display the search query, a search needs included in the search query, and the degree thereof in association with each other.

According to one aspect, an evaluation program is provided for causing a computer to function as: a content acquisition means configured to acquire one or more pieces of content contained in each of a plurality of evaluation target web pages that belongs to an evaluation target unit and a degree thereof; an adding means configured to add the degree of each of the content contained in the plurality of evaluation target web pages to acquire content of the evaluation target unit and the degree thereof; and a display data generation means configured to generate display data for displaying the content of the evaluation target unit and the degree thereof in association with the evaluation target unit.

The evaluation target unit may be a domain, and the plurality of evaluation target web pages that belong to the evaluation target unit may be web pages having the domain in common.

The evaluation target unit may include two or more evaluation target web pages designated by a user.

There may be a plurality of the evaluation target units, and in response to a user operation, the display data generation means may generate: first display data for displaying the content and the degree thereof for all the evaluation target units, or second display data for displaying the content and the degree thereof for only part of the plurality of evaluation target units according to designation from the user.

There may be a plurality of the evaluation target units, and the display data generation means may generate display data for displaying the content of each of the evaluation target units and the degree thereof in order according to designation from the user in association with the plurality of evaluation target units.

The adding means may obtain the degree of the evaluation target unit by weighting and adding according to a number of inflows or economic scale of the evaluation target web pages.

The one or more pieces of content contained in the evaluation target web page and the degree thereof may be based on one or more pieces of content contained in each of a plurality of search queries associated with the evaluation target web page, the degree thereof, and a web page in a search result for the search query.

The content acquisition means may: acquire one or more pieces of content contained in each of a plurality of search queries, the degree thereof, and a web page in a search result for the search query; and determine the content contained in the evaluation target web page and the degree thereof based on content contained in one or more search queries with the evaluation target web page in the search result, and the degree thereof.

When specified content is contained in the one or more search queries with the evaluation target web page in the search result, the content acquisition means may determine that the specified content is contained in the evaluation target web page.

The content acquisition means may determine the degree of the certain content determined to be contained in the evaluation target web page by adding the degree of the certain content contained in each of the one or more search queries with the evaluation target web page in the search result.

The content acquisition means may determine the degree of the certain content determined to be contained in the evaluation target web page by adding the degree of the certain content contained in each of the one or more search queries with the evaluation target web page in the search result in consideration of the number of searches of each of the one or more search queries.

The display data generation means may generate the display data for displaying the content of the evaluation target unit and the degree thereof as a color bar, one color in the color bar may correspond to one piece of the content, and an area occupied by the one color in the color bar may correspond to the degree of the content corresponding to the color.

According to one aspect, an evaluation program is provided for causing a computer to function as: an acquisition means configured to acquire one or more words contained in one or more web pages that come up for a target search query, a number of times each of the words is used in each of the web pages, one or more pieces of content contained in the one or more web pages, and a degree thereof; a calculation means configured to calculate the degree of the content of each of the acquired words according to the number of times and the degree of the content contained in the web pages; and a display data generation means configured to generate display data for displaying the content and the degree in association with each of the words.

The calculation means may calculate the degree of the content of each of the words in consideration of a number of inflows or acquired economic scale of each of the one or more web pages.

According to one aspect, an evaluation device is provided including: a content acquisition means configured to acquire one or more pieces of content contained in an evaluation target web page that is an evaluation target unit and a degree thereof; and a display data generation means configured to generate display data for displaying the content of the evaluation target web page and the degree thereof in association with the evaluation target web page.

According to one aspect, an evaluation method is provided including the steps of: acquiring, by a content acquisition means, one or more pieces of content contained in an evaluation target web page that is an evaluation target unit and a degree thereof; and generating, by a display data generation means, display data for displaying the content of the evaluation target web page and the degree thereof in association with the evaluation target web page.

According to one aspect, an evaluation device is provided including: a content acquisition means configured to acquire one or more pieces of content contained in each of a plurality of evaluation target web pages that belongs to an evaluation target unit and a degree thereof; an adding means configured to add the degree of each of the content contained in the plurality of evaluation target web pages to acquire content of the evaluation target unit and the degree thereof; and a display data generation means configured to generate display data for displaying the content of the evaluation target unit and the degree thereof in association with the evaluation target unit.

According to one aspect, an evaluation program is provided including the steps of: acquiring, by a content acquisition means, one or more pieces of content contained in each of a plurality of evaluation target web pages that belongs to an evaluation target unit and a degree thereof; adding, by an adding means, the degree of each of the content contained in the plurality of evaluation target web pages to acquire content of the evaluation target unit and the degree thereof; and generating, by a display data generation means, display data for displaying the content of the evaluation target unit and the degree thereof in association with the evaluation target unit.

According to one aspect, a notification program is provided for causing a computer to function as: an acquisition means configured to acquire a monitoring target value; a comparison means configured to compare the monitoring target value with a reference value; and a notification information generation means configured to generate notification information according to a comparison result, in which the monitoring target value is: a proportion of certain search needs to a certain search query, an estimated amount of inflow of the certain search needs in the certain search query, an acquired economic scale of the certain search needs in the certain search query, or needs purity of the certain search query.

The acquisition means may acquire the monitoring target value from a search engine.

The acquisition means may acquire search data from a search engine and calculate the monitoring target value based on the search data.

According to one aspect, a notification device is provided including: an acquisition means configured to acquire a monitoring target value; a comparison means configured to compare the monitoring target value with a reference value; and a notification information generation means configured to generate notification information according to a comparison result, in which the monitoring target value is: a proportion of certain search needs to a certain search query, an estimated amount of inflow of the certain search needs in the certain search query, an acquired economic scale of the certain search needs in the certain search query, or needs purity of the certain search query.

According to one aspect, a notification method is provided including the steps of: acquiring, by an acquisition means, a monitoring target value; comparing, by a comparison means, the monitoring target value with a reference value; and generating, by a notification information generation means, notification information according to a comparison result, in which the monitoring target value is: a proportion of certain search needs to a certain search query, an estimated amount of inflow of the certain search needs in the certain search query, an acquired economic scale of the certain search needs in the certain search query, or needs purity of the certain search query.

BRIEF DESCRIPTION OF DRAWINGS

FIG. 2 is a diagram showing a search result for "storage".

FIG. 4A is a diagram schematically showing search needs of the evaluation target search queries displayed on a user terminal 3 and the degree thereof.

FIG. 4B is a diagram schematically showing the search needs of the evaluation target search queries displayed on the user terminal 3 and the degree thereof.

FIG. 5A is a diagram schematically showing a screen example when it is possible to filter the evaluation target search queries according to the search needs.

FIG. 5B is a diagram schematically showing a screen example when it is possible to filter the evaluation target search queries according to the search needs.

FIG. 6A is a diagram schematically showing a screen example when it is possible to filter the evaluation target search queries according to a proportion of the search needs.

FIG. 6B is a diagram schematically showing a screen example when it is possible to filter the evaluation target search queries according to the proportion of the search needs.

FIG. 7A is a diagram schematically showing a screen example when it is possible to display the evaluation target search queries in order designated by a user.

FIG. 7B is a diagram schematically showing a screen example when it is possible to display the evaluation target search queries in order designated by the user.

FIG. 8 is a diagram schematically showing a screen example displaying a color bar with a length corresponding to the number of searches (or number of inflows).

FIG. 9A is a diagram schematically showing a screen example when it is possible to filter the evaluation target search queries according to the number of inflows of specified search needs.

FIG. 9B is a diagram schematically showing a screen example when it is possible to filter the evaluation target search queries according to the number of inflows of specified search needs.

FIG. 10 is a diagram schematically showing a screen example when the search needs of a search query group are displayed with the color bar.

FIG. 11 is a block diagram showing a schematic configuration of a web page evaluation system according to a second embodiment.

FIG. 12A is a diagram schematically showing content contained in evaluation target web pages and the degree thereof.

FIG. 12B is a diagram schematically showing a search result for respective search queries.

FIG. 13A is a diagram showing one example of a screen displayed on a display 33.

FIG. 13B is a diagram showing one example of the screen displayed on the display 33.

FIG. 14A is a diagram schematically showing a screen example when it is possible to filter web pages according to content.

FIG. 14B is a diagram schematically showing a screen example when it is possible to filter the web pages according to the content.

FIG. 15A is a diagram schematically showing a screen example when it is possible to display the evaluation target web pages in order designated by a user.

FIG. 15B is a diagram schematically showing a screen example when it is possible to display the evaluation target web pages in order designated by the user.

FIG. 18 is a diagram obtained by adding the content and the degree for each domain.

FIG. 19 is a diagram showing a search result for respective search queries.

FIG. 20 is a diagram schematically showing search needs of respective search queries and the degree thereof.

FIG. 21 is a diagram schematically showing search needs for evaluation target web pages and the degree thereof.

FIG. 22 is a diagram showing one example of a screen displayed on a display 33.

FIG. 23 is a diagram schematically showing a search result for respective search queries.

FIG. 24 is a diagram schematically showing content of respective web pages and the degree thereof.

FIG. 25 is a diagram schematically showing the degree of content added for respective domains.

DESCRIPTION OF EMBODIMENTS

Embodiments according to the present invention will be specifically described below with reference to the drawings.

First Embodiment

A person who performs a search naturally performs the search with some kind of intention. However, that intention is not necessarily directly reflected in a search query.

For example, "storage" means a warehouse facility, storage furniture, and data storage means in computers or the like (there may be others, which however will be omitted here). Therefore, a person who searches for "storage" may intend to search for a warehouse facility, may intend to search for storage furniture, or may intend to search for a data storage means.

In this specification, with what intention a certain search query is searched for is referred to as "search needs" (of the search query/included in the search query). In the above-described example, "storage" includes three search needs: warehouse facility, storage furniture, and data storage means.

Usually, it is subjectively considered that a person who performs a search with a search query of "storage" performs a search with an intention of one of these meanings. However, objectively, it is not easy to know with what intention the search query is searched for.

Therefore, the first embodiment evaluates what kind of search needs are included in a search query to what degree (to what extent respective search needs are mixed). The degree corresponds to, in the above-described example, the proportion in which those who intend to use each of the warehouse facility, the storage furniture, and the data storage means are mixed, out of those who perform a search for "storage".

Figure 1:
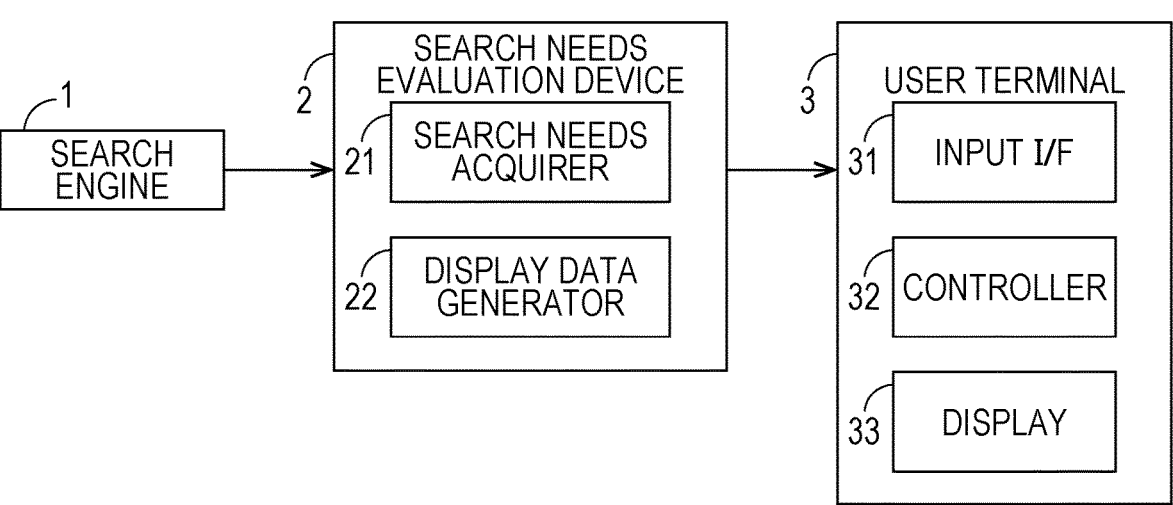
FIG. 1 is a block diagram showing a schematic configuration of a search needs evaluation system according to a first embodiment.

FIG. 1 is a block diagram showing a schematic configuration of a search needs evaluation system according to the first embodiment. The search needs evaluation system includes a search engine 1, a search needs evaluation device 2, and a user terminal 3.

The search engine 1 outputs a search result for an arbitrary search query including one or more words. Note that the "word" as used herein means an expression or phrase including one or more morphemes. In the search result, one or more web pages appear in predetermined display ranking. The search engine 1 sets the display ranking standard independently such that a web page that is likely to match the search needs will be displayed with higher ranking by using content analysis data of each web page and behavioral data of search visitors such as click-through rate (CTR), stay time, and page exit rate. Therefore, it can be said that the search needs are reflected in the search result. The present embodiment uses the fact that the search needs tend to be reflected in the search result.

The search needs evaluation device 2 is a computer including a search needs acquirer 21 and a display data generator 22. Some or all of functions of these modules may be implemented by a processor of the search needs evaluation device 2 executing a predetermined program.

The search needs acquirer 21 acquires one or more search needs included in an evaluation target search query arbitrarily designated by a user and the degree thereof. The search needs acquirer 21 may acquire the search needs and the degree thereof by reception from outside, or may acquire the search needs and the degree thereof by receiving necessary search data from the search engine 1 and analyzing the search data by itself. The latter will be described below.

The display data generator 22 generates display data for causing the user terminal 3 to display the search needs included in the evaluation target search query and the degree thereof, and transmits the display data to the user terminal 3. As one example, the display data generator 22 displays the search needs and the degree thereof by using a color bar (to be described later).

The user terminal 3 is a computer including an input interface 31 (mouse, keyboard, touch panel, or the like), a controller 32, and a display 33. The controller 32 causes the display 33 to display the search needs included in the evaluation target search query and the degree thereof based on the display data from the search needs evaluation device 2. The controller 32 may be a web browser the user terminal 3 has in advance. Alternatively, some or all of functions of the controller 32 may be a dedicated application implemented by the processor of the user terminal 3 executing a predetermined program.

The following will specifically describe a case where the evaluation target search query is "storage" as an example.

FIG. 2 is a diagram showing a search result for "storage". Here, it is assumed that when the search engine 1 performs a search with "storage" as a search query, web pages W1 to W6 are outputted in this display ranking. The number of searches for this search query (number of searches per month, hereinafter the same) is 2,000, and the number of inflows into the web pages W1 to W6 is as shown in the figure. Note that the number of inflows may be an actual measurement value or an estimated value based on display ranking or the like (this point also applies to the "number of inflows" below). Such search data is provided from the search engine 1 to the search needs acquirer 21 of the search needs evaluation device 2.

The search needs acquirer 21 classifies the web pages W1 to W6 into subsets. One classified subset corresponds to one search need. It can also be said that the search needs acquirer 21 performs classification such that one search need corresponds to one subset by using the fact that the search needs are reflected in the search result.

As a classification technique, the technique described in Patent Literature 2 can be applied. For example, the search needs acquirer 21 may convert at least one of the content and structure of a plurality of web pages into multidimensional feature vector data and classify the plurality of web pages into a plurality of subsets based on the feature vector data. More specifically, the search needs acquirer 21 may perform classification by performing processing according to clustering or class classification algorithm on the feature vector data. Alternatively, the search needs acquirer 21 may identify the degree of similarity between the feature vector data and perform classification based on the degree of similarity.

Note that in practice, many web pages can come up for one search query, and in that case, all the web pages may be classified, or only a predetermined number of web pages with high display ranking may be classified.

Figures 3A, 3B:
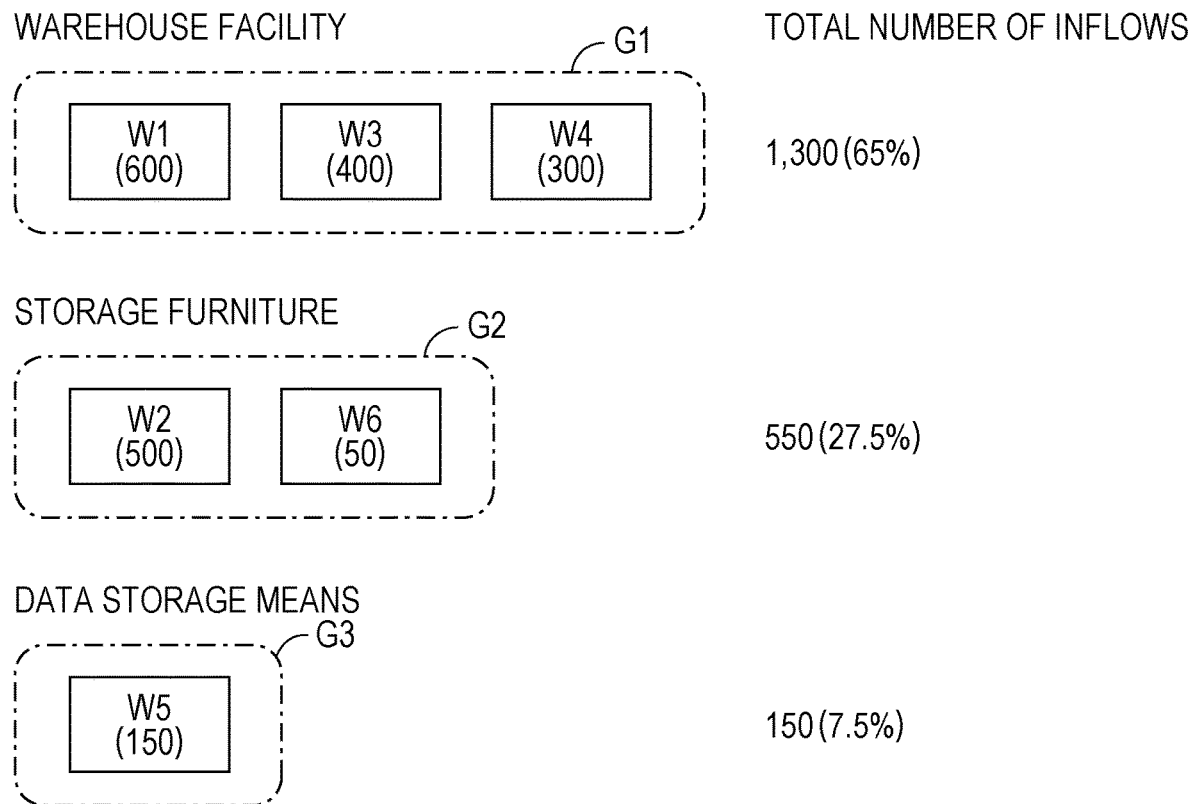
FIG. 3A is a diagram schematically showing a result of classifying web pages W1 to W6 into subsets.
FIG. 3B is a diagram showing the number of searches and search needs for evaluation target queries.

FIG. 3A is a diagram schematically showing the result of classifying the web pages W1 to W6 into subsets. Here, it is assumed that the web pages W1, W3, and W4 are classified into a first subset G1, the web pages W2 and W6 are classified into a second subset G2, and the web page W5 is classified into a third subset G3. Note that the search needs acquirer 21 may determine that the search needs are the warehouse facility by analyzing the web pages W1, W3, and W4 (title, image, voice thereof), and the like in the first subset G1 to identify the content of the web pages. The same is true for other subsets.

Here, according to FIG. 2, since the number of inflows of the web pages W1, W3, and W4 in the first subset G1 is 600, 400, and 300, respectively, the total number of inflows to the web pages W1, W3, and W4 in the first subset G1 is 1,300. Similarly, the total number of inflows to the web pages W2 and W6 in the second subset G2 is 550. The total number of inflows to the web page W5 in the third subset G3 is 150.

Therefore, the proportion of the total number of inflows to the web pages in the first to third subsets is 65.0%, 27.5%, and 7.5%, respectively. In this way, the total value of the number of inflows of web pages classified into each subset corresponds to the degree of search needs corresponding to the subset.

As described above, the search needs acquirer 21 acquires that "storage" has three search needs corresponding to the first to third subsets, and that the degree ratio is 65.0:27.5:7.5.

The search needs acquirer 21 may acquire needs purity of the evaluation target search query as needed. The needs purity is an index indicating the degree of variation in search needs included in a search query. When the search result is occupied by web pages with similar or resembling properties, the needs purity will be large, and when web pages of various properties appear in the search result, the needs purity will be small.

The needs purity can be calculated based on, for example, dispersion of web pages. More specifically, average coordinates of the feature vector data of all web pages (or web pages in the subset) may be calculated and the dispersion of the distance from the average coordinates of each feature vector data may be used as the needs purity. Alternatively, the needs purity may be calculated based on the average path length between nodes of the web pages.

The processing for one search query "storage" has been described above. When there are other search queries to be evaluated, the search needs acquirer 21 similarly acquires the search needs and the degree thereof. For example, as shown in FIG. 3B, when the evaluation target search queries are "storage", "storage near me", and "data storage", the number of searches, the search needs, and the degree thereof are acquired for each of the search queries.

Then, the display data generator 22 generates display data for causing the display 33 of the user terminal 3 to display the search needs included in the evaluation target search query and the degree thereof, and transmits the display data to the user terminal 3. According to this display data, the display 33 of the user terminal 3 displays the search needs included in the evaluation target search query and the degree thereof.

FIG. 4A is a diagram schematically showing search needs of the evaluation target search queries displayed on the user terminal 3 and the degree thereof. The display generator 22 generates display data for displaying such a screen.

In the present embodiment, the search needs and the degree thereof are indicated by color bars C1 to C3. For convenience, each pattern (spot, diagonal line, and crossed line) indicates one color in the color bars C1 to C3 of FIG. 4A. One color in the color bars C1 to C3 corresponds to one search need. The area occupied by one color in the color bars C1 to C3 (that is, length of each part of the color bar) corresponds to the degree of search needs corresponding to the color.

For example, "storage" that is one of the evaluation target search queries includes three search needs corresponding to the first to third subsets of FIG. 3A. Therefore, the color bar for "storage" has 3 colors. Since the degree thereof is 65:27.5:7.5, the ratio of the area of the three colors is 65:27.5:7.5.

Meanwhile, "storage near me" that is one of the evaluation target search queries includes only one search need (warehouse facility), as shown in FIG. 3B. Therefore, the color bar for "storage near me" has only one color. The same is true for "data storage".

Other display examples of the search needs of the evaluation target search query and the degree thereof will be described below. In the following, for the purpose of description, results for more evaluation target search queries are obtained by the search needs evaluation device 2 as shown in FIG. 4B.

FIGS. 5A and 5B are screen examples when it is possible to filter evaluation target search queries according to search needs. As shown in FIG. 5A, the user can designate one or more search needs via the input interface 31. This figure is an example of designating "warehouse facility" out of the search needs by selecting the part of the color bar indicating "warehouse facility".

In FIG. 5A, six evaluation target search queries, "storage", "storage near me", "storage sheds", "cube storage", "mini storage" and "storage solutions" include "warehouse facility" as search needs. Therefore, the display data generator 22 generates display data, as shown in FIG. 5B, for displaying only these six evaluation target search queries and information associated therewith (number of searchers, needs purity, color bar) and hiding other evaluation target search queries.

Note that, unlike FIG. 5A, evaluation target search queries that do not include one or more search needs designated by the user may be displayed. Evaluation target search queries that include one or more search needs designated by the user may be not displayed. In any case, the display data generator 22 preferably generates display data for displaying search needs and the degree thereof for only evaluation target search queries identified based on the search needs designated by the user.

FIGS. 6A and 6B are screen examples when it is possible to filter evaluation target search queries according to the degree of search needs. As shown in FIG. 6A, the user can designate search needs and the degree thereof via the input interface 31. This figure is an example of designating "warehouse facility" out of the search needs and designating 30% as the degree by selecting the part of the color bar indicating "warehouse facility".

In FIG. 6A, three evaluation target queries, "storage", "storage near me", and "mini storage" include "warehouse facility" as search needs and the degree thereof is 30% or more. Therefore, the display data generator 22 generates display data, as shown in FIG. 6B, for displaying only these three evaluation target search queries and information associated therewith (number of searchers, needs purity, color bar) and hiding other evaluation target search queries.

Note that the degree may be designated in the form of inputting a numerical value, using a slider, or selection from numerical values determined in advance. The degree may not be limited to be designated as a certain percentage or more, but may be designated as a certain percentage or less, may be designated as a range from a certain percentage to a certain percentage, or may be designated to exclude a range from a certain percentage to a certain percentage. In any case, the display data generator 22 can preferably generate display data for displaying search needs and the degree thereof for only the evaluation target search query identified based on the search needs designated by the user and the degree thereof.

As described above, the display data generator 22 can preferably generate display data for displaying the search needs and the degree thereof for all the evaluation target search queries in response to the user operation, and can also preferably generate display data for displaying the search needs and the degree thereof for only some of the plurality of evaluation target search queries in response to designation from the user.

FIGS. 7A and 7B are screen examples when it is possible to display evaluation target search queries in order designated by the user. As shown in FIG. 7A, the user can designate the search needs via the input interface 31. This figure is an example of designating "warehouse facility" out of the search needs by selecting the part of the color bar indicating "warehouse facility".

In this case, as shown in FIG. 7B, the display data generator 22 generates display data for sorting and displaying the evaluation target search queries in the order of the degree of "warehouse facility". Note that the order may be descending order or ascending order, but the user can preferably select either order as shown in FIG. 7A.

In this way, the display data generator 22 can preferably generate the display data for displaying the plurality of evaluation target search queries in the order designated by the user.

FIG. 8 is a screen example displaying the color bar with a length according to the number of searches (or number of inflows). For example, the color bar of the evaluation target search query "storage" has a length L1 (in other words, total area of the color bar) according to the number of searches 368,000. The color bars of other search queries are also displayed with a length according to the number of searches, specifically with a length proportional to the number of searches. The length of the color bar may be according to the number of inflows or the economic scale.

FIGS. 9A and 9B are screen examples when it is possible to filter evaluation target search queries according to the number of inflows of specified search needs. As shown in FIG. 9A, the user can designate search needs and the number of searches via the input interface 31. This figure is an example of designating "warehouse facility" out of the search needs and designating 50,000 per month as the number of inflows by selecting the part of the color bar indicating "warehouse facility".

As described with reference to FIG. 3B, the search needs acquirer 21 determines the number of inflows for each search need for each of the evaluation target search queries. Therefore, the display data generator 22 generates display data, as shown in FIG. 9B, for displaying only the evaluation target search queries with the number of inflows of "warehouse facility" of 50,000 per month and information associated therewith (number of searchers, needs purity, color bar) and hiding other evaluation target search queries.

Note that the number of inflows may be designated in the form of inputting a numerical value, using a slider, or selection from numerical values determined in advance. The number of inflows may not be limited to be designated as a certain percentage or more, but may be designated as a certain percentage or less, may be designated as a range from a certain percentage to a certain percentage, or may be designated to exclude a range from a certain percentage to a certain percentage. In any case, the display data generator 22 can preferably generate display data for displaying search needs and the degree thereof for only the evaluation target search query identified based on the search needs designated by the user and the number of inflows. The number of searches may be used instead of the number of inflows.

The search needs are displayed for each search query as described above, but it is also effective to display the search needs for a "search query group" into which a plurality of search queries related to each other is integrated.

When creating a website or web page, it can be difficult to check the search needs of each of a large number of search queries. Therefore, first of all, if it is possible to select one search query group as a target by briefly overviewing search query groups that are a collection of the plurality of search queries, and then to check each search query in the search query group and select the search query as a target, efficiency in creating a website or web page will be increased.

Therefore, as described below, the display data generator 22 may acquire (calculate) the search needs included in the search query group and the degree thereof to display the search needs for each search query group based on the search needs included in the plurality of search queries and the degree thereof. An example of the method for calculating the degree of the search needs included in the search query group will be described below.

For example, it is assumed that the search query group W contains the search queries Q1 to Qn. It is assumed that the vector Ck of the degree of the search needs of the search query Ok is represented by the following Formula (1).

[Formula 1]

$$C_k = \begin{pmatrix} c_{ka} \\ c_{kb} \\ c_{kc} \\ \vdots \end{pmatrix} \tag{1}$$

The above Formula (1) indicates that the search query Qk includes the search needs a, b, c, . . . , and that the degrees are Cka, Ckb, Ckc, . . . , respectively. In this case, the display data generator 22 calculates respective search needs included in the search query group W and the degree thereof based on the following Formula (2).

[Formula 2]

$$C_w = \sum_{k=1}^{n} (v_k + A) \begin{pmatrix} c_{ka} \\ c_{kb} \\ c_{kc} \\ \vdots \end{pmatrix} \tag{2}$$

Here, A is a constant and may be 0. vk may be a constant, or may be a weight that takes into account the number of searches in the search query k, search scale, and the like.

As one example, FIG. 10 is an example of displaying the search needs of the search query groups "storage", "warehousing", and "data storage" with the color bar. The search query group here means the search query group in which expressions of each group name are in the search query. As an example, the search query group "storage" represents the search query group in which the expression storage is used, such as "storage", "storage XX", and "XX storage" (XX is an arbitrary expression). As shown in the figure, in the search query group "storage", the search need of "warehouse facility" is large, but there is also a certain amount of search needs of "storage furniture" and "data storage means". Meanwhile, "warehouse facility" accounts for the most part of the search needs of the search query group "warehousing", and "data storage means" accounts for the most part of the search needs of the search query group "data storage".

By displaying the search needs integrated into the search query group in this way, it is possible to easily compare the search query groups. Therefore, a website or web page creator can quickly select the target search query group first. For example, when creating a web page with the theme of the data storage means, with reference to FIG. 10, it can be understood that, first of all, it is necessary to approach "data storage" (then, approach individual search query in "data storage").

Note that FIG. 10 is only one example of display, and the total value of the number of searches of the search queries in the search query group and the number of search queries in the search query group may be written together. In addition, it may be possible to perform control as described with reference to FIGS. 5A to 9B (search query of each figure is replaced with the search query group).

As an example, the search query group is expressed as a group of search queries containing common expressions, but a plurality of arbitrary search queries that do not have specified expressions in common may be used as a search query group.

Note that the technique for displaying the search needs and the degree thereof is not limited to the color bar. For example, an arbitrary display mode instead of color (for example, pattern as in FIG. 4A) may correspond to one search need. The search needs and the degree thereof may be shown in a tabular form. In an arbitrary figure instead of a bar (for example, circle), the area occupied by one display mode may indicate the degree of search needs corresponding to the display correspondence. In that case as well, as shown in FIG. 8, the display data preferably includes information indicating the number of searches (number of inflows) of the evaluation target query, such as the size of a figure corresponds to the number of searches (number of inflows).

In this way, the first embodiment can display the search needs included in the evaluation target search query and the degree thereof in an easy-to-understand way by using color bar or the like. Therefore, the web page creator can quickly determine what kind of web page is to be created for what kind of search query. Therefore, it is no longer necessary to cause the user terminal 3 to display the screen as shown in FIG. 4A for a long time, and the power consumption of the user terminal 3 can be reduced. Only the display data needs to be transmitted from the search needs evaluation device 2 to the user terminal 3 (there is no need to transmit the search data itself), and the amount of communication can be reduced.

Second Embodiment

The first embodiment described above has evaluated the search needs included in the search query and the degree thereof. Meanwhile, the second embodiment described below evaluates search needs that are met by content of a web page and the degree thereof.

In this specification, one or more themes of a web page identified by analyzing the web page are referred to as "content" (of the web page/contained in the web page). For example, when a web page has only a warehouse facility as the theme, the content contained in the web page is only the "warehouse facility". Meanwhile, when another web page has a warehouse facility and storage furniture as the theme, the content contained in the web page is the "warehouse facility" and the "storage furniture".

The content of the web page may be obtained by analyzing information that can be acquired via the web, for example, an HTML source of the web page, php file, PDF file, presentation file, and the like. As a more specific example, words contained in a title tag of an HTML source may be used as the content of the web page. Alternatively, the content of the web page may be identified by performing natural language processing on a text contained in the web page, or may be identified by performing image and/or voice recognition.

The degree of the content contained in the web page is also quantitatively calculated by analyzing the HTML source or the like (as a specific example, degree of agreement and coverage of morpheme groups within the web page). For example, when the morpheme "warehouse facility" (or morpheme related to "warehouse facility") is used frequently but the morpheme "storage furniture" is not used much in a web page, it can be said that the web page contains the "warehouse facility" and "storage furniture" as the content, but that the degree of the former is higher.

The second embodiment displays the content contained in each web page and the degree thereof in an easy-to-understand way.

The content of the web page preferably agrees with search needs of a searcher that flow into the web page. For example, when a web page is created to approach a reader who wants information about "data storage means", as display ranking in a search result for a search query with a large degree of the search needs "data storage means" increases, the information is more likely to reach the target customer. Therefore, it can be said that the web page is favorable. Meanwhile, although the web page for the reader who wants "data storage means" is created, there is a possibility that the display ranking of the search result for the search query with a large degree of the search needs "storage furniture" is high and that the display ranking of the search result for the search query with a large degree of the search needs "data storage means" is low. This is a situation in which it is difficult for the information to reach the target customer, and is not a favorable situation. However, it is not easy to determine such a situation.

It is obviously important to determine the situation of competitors' sites and pages that occupy the top of the search result when creating or repairing a site and a page within the site. By considering details of the content of the top site, the degree of agreement with the searcher needs, and the degree of agreement of the needs of the customer base targeted by the site, it is possible to consider the importance and difficulty of creating and repairing the site and page. However, the number of search queries and the number of sites and pages coming up for the search queries are enormous, and it is extremely costly and not easy to analyze one by one.

Therefore, to evaluate the needs satisfied by each web page, the second embodiment displays, in an easy-to-understand way, the relationship between the content contained in the web page and the search needs included in the search query. Note that the following description will focus on the difference from the first embodiment.

FIG. 11 is a block diagram showing a schematic configuration of a web page evaluation system according to the second embodiment. The evaluation system includes a search engine 1, a web page evaluation device 4, and a user terminal 3. The web page evaluation device 4 includes the search needs acquirer 21 described in the first embodiment, a content acquirer 41, and a display data generator 42. Some or all of functions of these modules may be implemented by a processor of the search needs evaluation device 2 executing a predetermined program.

The content acquirer 41 acquires one or more pieces of content contained in the evaluation target web page arbitrarily designated by a user and the degree thereof.

The content acquirer 41 may acquire the content and the degree thereof by reception from outside. Alternatively, the content acquirer 41 may acquire the content and the degree thereof by voluntarily performing the above-described analysis on the evaluation target web page.

A specific description will be given below by taking the case where the evaluation target web page is "a.com/index.html", "b.com/index.html", and "c.com/index.html" as an example.

FIG. 12A is a diagram showing the content of the evaluation target web pages and the degree thereof. As shown in the figure, the content of "a.com/index.html" contains "warehouse facility", "storage furniture" and "data storage means", and the degree thereof is 80%, 15%, and 5%, respectively. "b.com/index.html" and "c.com/index.html" are also as shown in the figure. Note that the color bars on the right side of FIG. 12A show the content of respective evaluation target web pages and the degree thereof.

The content acquirer 41 acquires the search result for a plurality of search queries associated with the evaluation target web page. Note that such search queries may be designated by the user, or may be designated by the content acquirer 41 analyzing the evaluation target web page.

FIG. 12B is a diagram showing the search result for respective search queries associated with the evaluation target web pages. For example, in the search result for the search query "storage", the display ranking first place is "a.com/index.html", and the second place is "b.com/index.html" (the third place is a web page that is not to be evaluated). Note that although omitted in the figure, in reality, the search result for the fourth place and below may also be acquired. The search needs acquirer 21 can acquire the number of searches and the needs purity of respective search queries.

The display data generator 42 generates display data for displaying a screen for evaluating the evaluation target web page on a display 33 based on information shown in FIGS. 12A and 12B.

FIG. 13A is a diagram showing one example of the screen displayed on the display 33. The part indicated by "P" in the figure is the same as in FIG. 4A of the first embodiment. The color bars indicated by "Q" in FIG. 13A is the content of respective evaluation target websites and the degree thereof, and are based on FIG. 11. Note that the length (in other words, total area) of the color bar may be common to all the evaluation target websites, or the color bar may be displayed with a length according to, specifically proportional to, the number of inflows or economic size (same as in FIG. 8). The table indicated by "R" in FIG. 13A is based on FIG. 12.

In this way, assuming that the evaluation target web page is an evaluation target unit, the search query associated with each evaluation target web page and the display ranking of the evaluation target web page in the search result for the search query are displayed in association with each other. Therefore, it is possible to determine at a glance in what display ranking each evaluation target web page is displayed for what search query The search query is associated with the search needs included in the search query and the degree thereof. Therefore, from the screen shown in FIG. 13A, it is possible to determine at a glance in what display ranking each evaluation target web page is displayed for the search query including what search needs.

Note that the display data generator 42 may calculate the number of inflows for the content of each evaluation target web page and contain the number of inflows in the display data based on the content of each evaluation target web page and the degree thereof and the total number of inflows acquired by the evaluation target web page (or economic scale, hereinafter the same). For example, when the total number of inflows to the evaluation target web page "a.com/index.html" is 1,000 and the content of the web page and the degree thereof are as shown in FIG. 12A, the number of inflows by "warehouse facility" is 1,000*80%=800, the number of inflows by "storage furniture" is 1,000*15%=150, and the number of inflows by "data storage means" is 1,000*5%=5.

With such a screen, it is possible to determine what search result (display ranking) is obtained for each evaluation target web page for the search query including what search needs.

For example, the evaluation target web page "c.com/index.html" contains only "data storage means" as the content thereof. The search result for the search query "data storage" that includes only "data storage means" as the search needs is the first place. That is, unlike "a.com/index.html" and "b.com/index.html", "c.com/index.html" is considered to be a web page that agrees with only the needs of "data storage means".

Another display example of the screen for evaluating the evaluation target web page will be described below. In the following, for the purpose of description, results for more evaluation target web pages are obtained by the web page evaluation device 4 as shown in FIG. 13B.

FIGS. 14A and 14B are screen examples when it is possible to filter web pages according to content. As shown in FIG. 14A, the user can designate one or more pieces of content via an input interface 31. This figure is an example of designating "warehouse facility" out of the content by selecting the part of the color bar indicating "warehouse facility".

In FIG. 14A, two evaluation target web pages "a.com/index.html" and "b.com/index.html" contain "warehouse facility" as the content. Therefore, the display data generator 22 generates display data, as shown in FIG. 14B, for displaying only these two evaluation target web pages and information associated therewith (display ranking for each search query, color bar) and hiding other evaluation target web pages.

Note that, unlike FIG. 14A, evaluation target web pages that do not contain one or more pieces of content designated by the user may be displayed. Evaluation target web pages that contain one or more pieces of content designated by the user may be not displayed. In any case, the display data generator 22 preferably generates display data for displaying the content and the degree thereof with the color bar or the like for only the evaluation target web page identified based on the content designated by the user.

As described above, the display data generator 42 can preferably generate the display data for displaying the content and the degree thereof for all the evaluation target web pages in response to the user operation, and can preferably generate the display data for displaying the content and the degree thereof for only some of the plurality of evaluation target web pages in response to the designation from the user.

FIGS. 15A and 15B are screen examples when it is possible to display evaluation target web pages in order designated by the user. As shown in FIG. 15A, the user can designate the content via the input interface 31. This figure is an example of designating "storage furniture" out of the content by selecting the part of the color bar indicating "storage furniture".

In this case, as shown in FIG. 15B, the display data generator 22 generates display data for sorting and displaying the evaluation target web pages in the order of the degree of "storage furniture". Note that the order may be descending order or ascending order, but the user can preferably select either order as shown in FIG. 15A.

In this way, the display data generator 42 can preferably generate the display data for displaying the plurality of evaluation target web pages in the order designated by the user.

As described above, the second embodiment can display in what display ranking the evaluation target web page is displayed for the search query including what search needs in an easy-to-understand way. Therefore, the web page creator can quickly determine whether the needs of the assumed customer base agree with the content of the web page and the search needs of the searcher that flows into the web page.

By performing filtering or sorting designated by the user, it is possible to display only a competing site that agrees with the target search needs of the user's site, and it is possible to easily acquire information for planning site creation and repair after considering information on the competing site.

Therefore, this technology makes it possible to efficiently perform analysis that normally requires enormous human resources, eliminate the need for the user terminal 3 to display the screen as shown in FIG. 13A for a long time, and reduce the power consumption of the user terminal 3. Only the display data needs to be transmitted from a web page evaluation device 4 to the user terminal 3 (there is no need to transmit the search data itself), and the amount of communication can be reduced.

Third Embodiment

The third embodiment to be described next is a modification of the second embodiment. That is, while the second embodiment has evaluated individual web pages, the third embodiment evaluates a plurality of web pages having a common domain on a domain-by-domain basis. The following description will focus on the difference from the second embodiment.

Figures 16, 17:
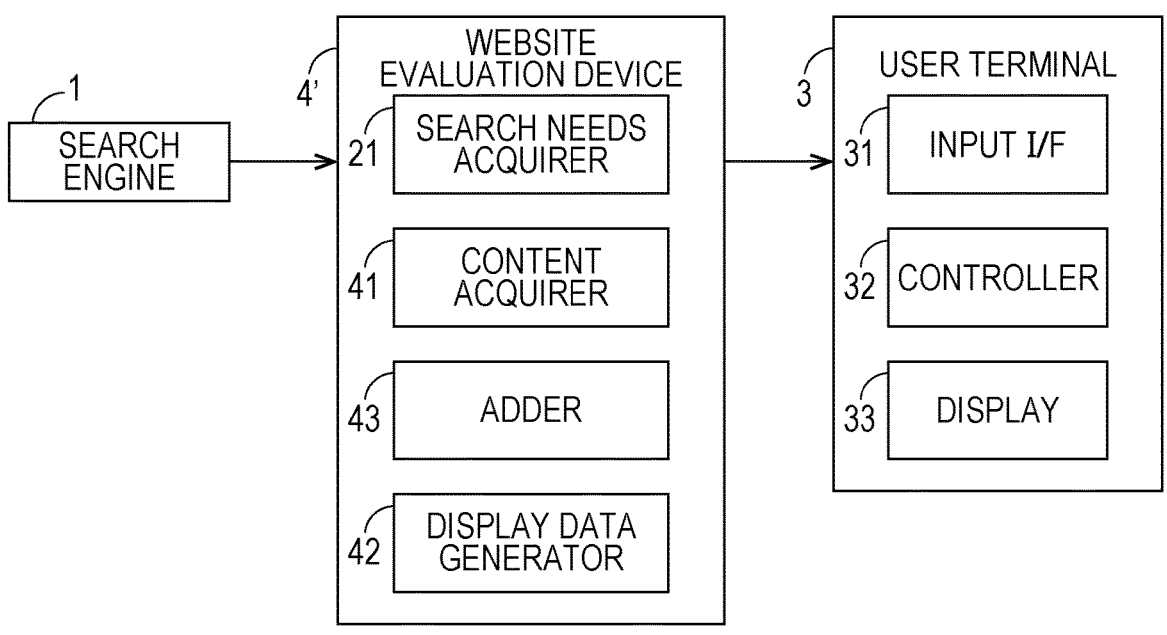
FIG. 16 is a block diagram showing a schematic configuration of an evaluation system according to a third embodiment.
FIG. 17 is a diagram showing one example of content of each of a plurality of web pages acquired by a content acquirer 41 and the degree thereof.

FIG. 16 is a block diagram showing a schematic configuration of an evaluation system according to the third embodiment. A website evaluation device 4' of the present embodiment further includes an adder 43.

For each of a plurality of web pages having a common evaluation target domain arbitrarily designated by a user (evaluation target web pages), a content acquirer 41 acquires one or more pieces of content contained in the web page and the degree thereof. Note that it can be said that the plurality of web pages having a common domain is web pages belonging to the domain. The acquisition technique is as described in the second embodiment.

For each of the content of the plurality of web pages having a common domain, the adder 43 adds up the degree thereof. By this addition, the content of the evaluation target domain and the degree thereof are calculated. For example, it is assumed that there are web pages W1 to Wn that have a common domain. It is assumed that the vector Ck of the degree of the content of the web page Wk is represented by the following Formula (3).

[Formula 3]

$$C_k = \begin{pmatrix} c_{ka} \\ c_{kb} \\ c_{kc} \\ \vdots \end{pmatrix} \tag{3}$$

The above-described Formula (3) indicates that the web page Wk contains content a, b, c . . . and the degree thereof is Cka, Ckb, Ckc . . . , respectively. In this case, the adder 43 calculates the content of the evaluation target domain W and the degree thereof based on the following Formula (4).

[Formula 4]

$$C_w = \sum_{k=1}^{n} (v_k + A) \begin{pmatrix} c_{ka} \\ c_{kb} \\ c_{kc} \\ \vdots \end{pmatrix} \tag{4}$$

Here, A is a constant and may be 0. vk can be the sum of the number of inflows of all the target search query groups in the web page Wk or the sum of the acquired economic scale. Alternatively, vk may also be a constant.

For example, when a web page is evaluated higher (with higher score) as the number of inflows (or acquired economic scale, hereinafter the same) increases, and when a web page is not evaluated (with zero score) as the sum of the number of inflows is zero, vk may be the sum of the number of inflows of all the target search query groups in the web page Wk, and A may be zero.

A web page with the larger sum of the number of inflows is evaluated higher, but (even if the number of inflows is zero) the existence itself is evaluated, vk may be the sum of the number of inflows of all the target search query groups in the web page Wk, and A may be a positive constant.

Alternatively, if a constant score (not depending on the sum of the number of inflows) is given to all existing web pages, A and vk may be constants.

Specific examples will be described below. FIG. 17 is a diagram showing one example of content of each of a plurality of web pages acquired by the content acquirer 41 and the degree thereof. In the figure, the evaluation target domain is assumed to be "a.com", "b.com", and "c.com". There are two web pages "a.com/home.html" and "a.com/torage.html" with "a.com" as the domain, and the content, the degree thereof, and the number of inflows v are shown. Other domains are also as shown in the figure.

FIG. 18 shows the sum of content of respective evaluation target domains based on the above-described Formula (4). For example, the degree of the content "warehouse facility" of the domain "a.com" is 100%*150+80%*30=174. By similar calculation, the degree of the content "storage furniture" and "data storage means" of "a.com" is 4.71 and 1.29, respectively.

As described above, as shown in FIG. 18, the evaluation target domain "a.com" contains the warehouse facility, the storage furniture, and the data storage means as the content, and the degree thereof is 174, 4.71, and 1.29 respectively (ratio is 96.7:2.6:0.7).

As a specific display screen example, for example, the table format as shown in FIG. 18 may be used, the color bar (right side of the figure) may be added, or only the color bar may be displayed. In the color bar of this case, one color corresponds to one piece of content contained in the domain (either web page in the lower layer of the domain). The area occupied by one color in the color bar corresponds to the degree of the content corresponding to the color.

In this way, the third embodiment can display the content contained in the evaluation target domain and the degree thereof in an easy-to-understand way. Many websites have a structure in which a plurality of web pages is linked in the lower layer of the so-called top page, but it is possible to evaluate whether the target search needs are adequately covered by either of the lower layer web pages.

In the second embodiment, the same display as described using FIG. 14A or the like may be performed. By performing filtering or sorting designated by the user with the content of the color bar, it is possible to display only competing sites that agree with the target search needs of the user's site, and it is possible to easily acquire information for planning site creation and repair after considering information on the competing sites.

Fourth Embodiment

The second embodiment described above has analyzed a web page to identify content contained in the web page. By analyzing the web page in this way, the content can be identified accurately. However, such analysis can be difficult (for example, when analysis resources are insufficient). Considering such cases, the present embodiment multiplies the search needs of each search query by the number of inflows to each evaluation target web page in the search query (or acquired economic scale) to estimate the content of the evaluation target web page and the degree thereof more easily and with lower costs.

The schematic configuration of the web page evaluation system according to the fourth embodiment is similar to the configuration shown in FIG. 10, and duplicate description thereof will be omitted. A content acquirer 41 acquires one or more pieces of content contained in the evaluation target web page arbitrarily designated by a user and the degree thereof. In the present embodiment, the content acquirer 41 may acquire the search needs and the degree thereof by reception from outside, or may acquire the search needs and the degree thereof by receiving necessary search data from a search engine 1 and analyzing the search data by itself. A specific description will be given below for the latter by taking the case where the evaluation target web page is "a.com/index.html", "b.com/index.html", and "c.com/index.html" as an example.

To begin with, the content acquirer 41 acquires the search result for a plurality of search queries associated with the evaluation target web page. Note that such search queries may be designated by the user, or may be designated by the content acquirer 41 analyzing the evaluation target web page.

FIG. 19 is a diagram showing a search result for respective search queries. For example, in the search result for the search query "storage", the display ranking first place is "a.com/index.html", and the second place is "b.com/index.html" (the third place and the fourth place are web pages that are not an evaluation target).

Subsequently, the content acquirer 41 acquires the search needs (of the search query) by classifying the web pages in the search result into subsets or the like, in a similar manner to the first embodiment. For each subset, the content acquirer 41 calculates the total number of inflows to the web pages in the subset.

It can be said that this total number of inflows is the degree of the search needs corresponding to each subset, with the number of searches added (weighted by the number of searches). For example, the degree of the search needs of the warehouse facility in "storage near me" is 100%, and the search needs of the data storage means in "data storage" is also 100%. However, while the total number of inflows of the former is 1, 500, the total number of inflows of the latter is 800, and therefore the degree is evaluated to be larger in the former.

FIG. 20 is a diagram schematically showing the search needs included in each search query obtained as described above and the total number of inflows thereof, and corresponds to FIG. 3B.

The content acquirer 41 acquires the search needs of the evaluation target web pages and the degree thereof based on the web pages in the search result for the search queries (FIG. 19) and the search needs included in the search queries and the degree thereof (FIG. 20) (specifically, by aggregating the search needs of the plurality of search queries), obtained as described above.

FIG. 21 is a diagram schematically showing search needs of evaluation target web pages and the degree thereof. First of all, the method for acquiring the search needs of the evaluation target web page "a.com/index.html" and the degree thereof will be described.

According to FIG. 19, "a.com/index.html" is in the search result for the search queries "storage" and "storage near me". According to FIG. 20, the search needs of the search query "storage" is the warehouse facility, the storage furniture, and the data storage means. Therefore, "a.com" includes the warehouse facility, the storage furniture, and the data storage means as the search needs. The search needs of the search query "storage near me" is the warehouse facility. Therefore, "a.com/index.html" includes the warehouse facility as the search needs. Summarizing the above, the content acquirer 41 determines that "a.com/index.html" includes the warehouse facility, the storage furniture, and the data storage means as the search needs.

Since the degree of the search needs of the warehouse facility included in the search query "storage" is 1, 300 and the degree of the search needs of the warehouse facility included in the search query "storage near me" is 1,500 (FIG. 7), the degree of the warehouse facility, which is one of the search needs, has a total of 2,800. In this way, by adding up the degree of common search needs included in each search query of which the evaluation target web page is in the search result (preferably, degree with the number of searches added), the content acquirer 41 determines the degree of the common search needs.

Meanwhile, the degree of the storage furniture, which is one of the search needs, is 550 because the degree of the search needs of the storage furniture included in the search query "storage" is 550. The degree of the data storage means, which is one of the search needs, is 150 because the degree of the search needs of the data storage means included in the search query "storage" is 150.

As described above, as shown in FIG. 21, "a.com/index.html" includes the warehouse facility, the storage furniture, and the data storage means as the search needs, and the degree thereof is 2,800, 550 and 150, respectively (ratio is 80.0:15.7:4.3).

Next, the evaluation target web page "b.com/index.html" will be described. According to FIG. 19, "b.com/index.html" is only in the search result for the search query "storage". According to FIG. 7, the search needs of the search query "storage" is the warehouse facility, the storage furniture, and the data storage means. Therefore, the content acquirer 41 determines that "b.com/index.html" includes the warehouse facility, the storage furniture, and the data storage means as the search needs.

The degree of the warehouse facility, which is one of the search needs, is 1, 300 because the degree of the search needs of the warehouse facility included in the search query "storage" is 1, 300. The degree of the storage furniture, which is one of the search needs, is 550 because the degree of the search needs of the storage furniture included in the search query "storage" is 550. The degree of the data storage means, which is one of the search needs, is 150 because the degree of the search needs of the data storage means included in the search query "storage" is 150.

As described above, as shown in FIG. 21, "b.com/index.html" includes the warehouse facility, the storage furniture, and the data storage means as the search needs, and the degree thereof is 1,300,550, and 150, respectively (ratio is 65.0:27.5:7.5).

Next, the evaluation target web page "c.com/index.html" will be described. According to FIG. 19, "c.com" is only in the search result for the search query "data storage". According to FIG. 20, the search needs of the search query "data storage" is only the data storage means. Therefore, the content acquirer 41 determines that "c.com" includes only the data storage means as the search needs.

The degree thereof is 800 because the degree of the data storage means included in the search query "data storage" is 800.

As described above, as shown in FIG. 21, "c.com/index.html" includes only the data storage means as the search needs, and the degree thereof is 800.

When the search needs of each web page and the degree thereof are acquired in this way, the display data generator 42 generates display data for causing a display 33 of a user terminal 3 to display the search needs included in the evaluation target search web page and the degree thereof, and transmits the display data to the user terminal 3. According to this display data, the display 33 of the user terminal 3 displays the search needs and the degree thereof in association with the evaluation target web page.

The displayed screen may be a table as shown on the left side of FIG. 21, or may be a color bar as in the first and second embodiments shown on the right side of the figure. The color bar may be replaced with an arbitrary display mode or arbitrary figure, as in the first and second embodiments.

The display data generator 42 may display the screen as shown in FIG. 22. The screen of FIG. 22 shows the search queries, the search needs and the degree thereof, the web pages, and the search needs and the degree thereof. Specifically, the plurality of search queries is arranged, and the search needs of the search queries and the degree thereof are displayed (for example, in the color bar) in association with each of the search queries. In addition, the number of searches and the needs purity may be displayed.

In association with each of the plurality of search queries, the ranking in which each web page is displayed as the search result for the search query is displayed. Furthermore, in association with each web page, the search needs of the web page and the degree thereof are displayed (for example, in the color bar). One color in the color bar corresponds to one search need included in the web page. The area occupied by one color in the color bar corresponds to the degree of the search need corresponding to the color.

As described in the second embodiment with reference to FIG. 14A and the like, the user can preferably perform filtering and sorting by using color bar information.

In this way, the fourth embodiment can display the content contained in the evaluation target web page and the degree thereof in an easy-to-understand way, based on the search needs of each search query and the number of inflows to each evaluation target web page in the search query (or acquired economic scale). Therefore, there is no need to analyze the web page to identify the content, and it is possible to quickly determine with what intention the search results are flowing in to the evaluation target web page. Therefore, it is no longer necessary to cause the user terminal 3 to display the screen as shown in FIG. 19 or 22 for a long time, and the power consumption of the user terminal 3 can be reduced. Only the display data needs to be transmitted from a web page evaluation device 4 to the user terminal 3 (there is no need to transmit the search data itself), and the amount of communication can be reduced.

Fifth Embodiment

The fifth embodiment to be described next is a modification of the fourth embodiment. That is, while the fourth embodiment has evaluated individual web pages, the fifth embodiment evaluates a plurality of web pages having a common domain on a domain-by-domain basis. The following description will focus on the difference from the second and third embodiments.

The schematic configuration of the evaluation system according to the fifth embodiment is the same as in FIG. 16, and includes an adder 43.

For each of a plurality of web pages having a common evaluation target domain arbitrarily designated by a user (evaluation target web pages), a content acquirer 41 acquires one or more pieces of content contained in the web page and the degree thereof. Note that it can be said that the plurality of web pages having a common domain is web pages belonging to the domain. The content acquirer 41 may acquire the content and the degree thereof by reception from outside, or may acquire the content and the degree thereof by receiving necessary search data from a search engine 1 and analyzing the search data by itself. A specific description will be given below for the latter by taking the case where the evaluation target domain is "a.com", "b.com", and "c.com" as an example.

To begin with, the content acquirer 41 acquires a search result for the plurality of search queries associated with the evaluation target domain. Note that such search queries may be designated by the user, or may be designated by the content acquirer 41 analyzing the web page in the lower layer of the evaluation target domain.

FIG. 23 is a diagram schematically showing the search result for respective search queries. For example, in the search result for the search query "storage", the display ranking first place is "a.com/storage", and the second place is "b.com" (the third and fourth places are web pages having domains that are not an evaluation target). In the search result for the search query "storage near me", the display ranking first place is "a.com/home", the second place is "a.com/storage", and the third place is "c.com/home". In the search result for the search query "data storage", the display ranking first place is "c.com/data".

Here, the web pages "a.com/storage" and "a.com/home" both have the domain "a.com". The web pages "c.com/home" and "c.com/data" both have the domain "c.com".

Subsequently, as in the second embodiment, the content acquirer 41 acquires the search needs (of the search query) by classifying the web pages appearing in the search result into subsets or the like. For each subset, the content acquirer 41 calculates the total number of inflows to the web pages in the subset.

Furthermore, as in the second embodiment, the content acquirer 41 acquires the content of each web page and the degree thereof based on the web page appearing in the search result for the search query and the search needs included in the search query and the degree thereof (specifically, by aggregating the search needs of the plurality of search queries).

FIG. 24 is a diagram schematically showing the content of respective web pages obtained as described above and the degree thereof, and corresponds to FIG. 12B.

For each of the content contained in the plurality of web pages having a common domain, the adder 43 adds up the degree thereof.

FIG. 25 is a diagram schematically showing the degree of the content added for respective domains. First of all, the addition of the content of the evaluation target domain "a.com" will be described.

According to FIG. 24, two web pages "a.com/home" and "a.com/storage" having "a.com" as the domain come up for the search query. The former contains the warehouse facility as the content, and the degree thereof is 1,500. The latter also contains the warehouse facility as the content, and the degree thereof is 2,800.

Therefore, for the warehouse facility, the adder 43 adds up the degree 1,500 of "a.com/home" and the degree 2,800 of "a.com/storage" to set the degree of the content of the warehouse facility contained in the evaluation target domain "a.com" to 4,300 (FIG. 23).

Meanwhile, according to FIG. 24, "a.com/storage" also contains the storage furniture and the data storage means as the content, but "a.com/home" does not contain the storage furniture and the data storage means as the content. Therefore, the adder 43 sets the degree of the content of the storage furniture and the data storage means contained in the evaluation target domain "a.com" to 550 and 150, which are equal to the degree of the content of "a.com/storage", respectively (FIG. 25).

As described above, as shown in FIG. 25, the evaluation target domain "a.com" contains the warehouse facility, the storage furniture, and the data storage means as the content, and the degree thereof is 4,300, 550, and 150, respectively (ratio is 86.0:11.0:3.0).

In this way, when one or more search queries with any web page in the lower layer of the evaluation target domain in the search result include a specified search need, the adder 43 determines that this specified search need is included in the content of the evaluation target domain (any web page in the lower layer). Then, by adding the degree of specified content contained in each of one or more search queries with any web page in the lower layer of the evaluation target domain appearing in the search result, the adder 43 determines the degree of the specified content determined to be contained in the evaluation target domain.

Next, the evaluation target domain "b.com" will be described. According to FIG. 24, only the web page "b.com" having "b.com" as the domain comes up for the search query. This web page "b.com" contains the warehouse facility, the storage furniture, and the data storage means as content, and the degree thereof is 1,300, 550, and 150, respectively.

Therefore, the adder 43 sets the degree of the content of the warehouse facility, the storage furniture, and the data storage means contained in the evaluation target domain "b.com" to 1,300,550, and 150, which are equal to the degree of the content of "b.com", respectively (FIG. 25).

As described above, as shown in FIG. 25, the evaluation target domain "c.com" contains the warehouse facility, the storage furniture, and the data storage means as the content, and the degree thereof is 1,300, 550, and 150, respectively (ratio is 65.0:27.5:7.5).

Next, the evaluation target domain "b.com" will be described. According to FIG. 24, two web pages "c.com/data" and "c.com/home" having "c.com" as the domain comes up for the search query.

Only "c.com/data" contains the data storage means as the content and the degree thereof is 800. Therefore, the adder 43 sets the degree of the content of the data storage means contained in the evaluation target domain "c.com" to 800, which is the same as the degree of the content of "c.com/data" (FIG. 25).

Only "c.com/home" contains the warehouse facility as the content and the degree thereof is 1, 500. Therefore, the adder 43 sets the degree of the content of the warehouse facility included in the evaluation target domain "c.com" to 1, 500, which is the same as the degree of the content of "c.com/home" (FIG. 25).

As described above, as shown in FIG. 25, the evaluation target domain "c.com" contains the warehouse facility and the data storage means as the content, and the degree thereof is 1,500 and 800, respectively (ratio is 65.2:34.8).

When the content of each web page and the degree thereof are acquired in this way, the display data generator 42 generates display data for causing a user terminal 3 to display the content contained in the evaluation target search domain and the degree thereof, and transmits the display data to the user terminal 3. According to this display data, a display 33 of the user terminal 3 displays the content and the degree thereof in association with the evaluation target domain.

The specific display screen can be, for example, the same as the display screen of FIG. 13A. In the color bar of this case, one color corresponds to one piece of content contained in the domain (either web page in the lower layer of the domain). The area occupied by one color in the color bar corresponds to the degree of the content corresponding to the color.

As described in the second embodiment with reference to FIG. 14A and the like, the user can preferably perform filtering and sorting by using color bar information.

In this way, the fifth embodiment can display the content contained in the evaluation target domain and the degree thereof in an easy-to-understand way. Many websites have a structure in which a plurality of web pages is linked in the lower layer of the so-called top page, but it is possible to evaluate which of the lower layer web pages covers the target content adequately.

Note that the third and fifth embodiments perform evaluation in the unit of domain. However, the evaluation unit is not limited to a domain, and can be two or more web pages arbitrarily designated by the user. For example, the user may designate two domains as an evaluation target. In this case, a web page having one of the two domains is the evaluation target web page and belongs to the evaluation target unit. Alternatively, the user may designate a specified web page. In this case, the web page in the lower hierarchy of the designated web page is the evaluation target web page and belongs to the evaluation target unit. In addition, the user may individually designate a plurality of web pages as the evaluation target unit.

Sixth Embodiment

The present embodiment assumes to create a web page with a specified search query (hereinafter referred to as "target search query") as a target. In that case, to know information and page content a user (searcher) wants, it is effective to refer to a web page that already has high search ranking for the target search query. Specifically, it is useful to know what word is used in such a web page and what word is important.

However, in words used within the page, the word that is often common in top search pages is not necessarily more important than words that are used only in some pages. This is because, for a search query in which the needs of the searcher are mixed, or the like, there is a possibility that pages with the search top page group satisfying different needs are mixed. Therefore, for whether or not the site creator should the word in the web page created by the site creator, it is important whether or not the word satisfies the target search needs.

Therefore, the sixth embodiment indicates the content (needs) and the degree thereof for each morpheme (word) to make it easy to determine the words to be contained in the web page for satisfying the target search needs.

Figures 26, 27A, 27B, 28A:
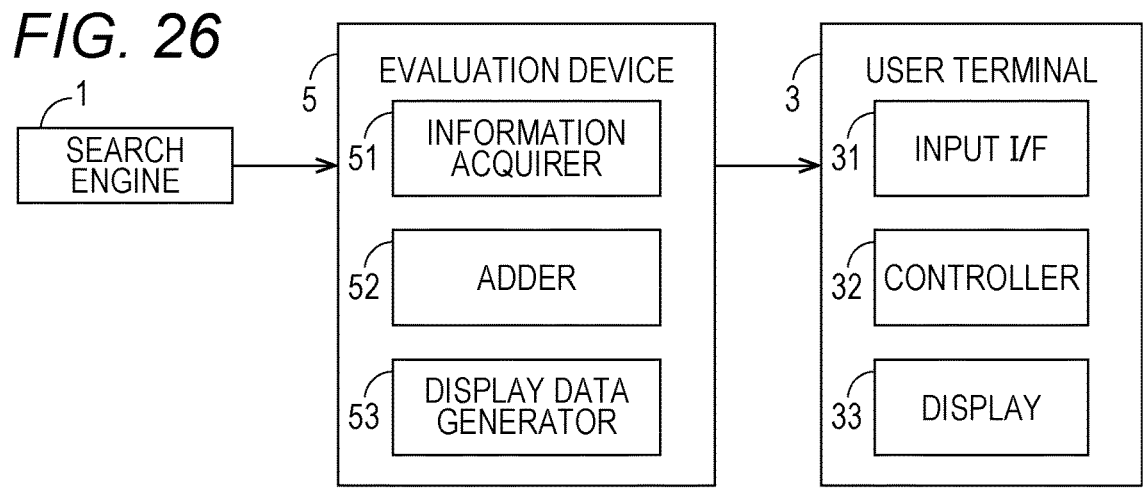
FIG. 26 is a block diagram showing a schematic configuration of an evaluation system according to a sixth embodiment.
FIG. 27A is a diagram schematically showing one example of information acquired by an information acquirer 51.
FIG. 27B is a diagram schematically showing another example of the information acquired by the information acquirer 51.
FIG. 28A is a diagram showing one example of a screen displayed on a display 33.

FIG. 26 is a block diagram showing a schematic configuration of an evaluation system according to the sixth embodiment. The evaluation system includes a search engine 1, an evaluation device 5, and a user terminal 3. Descriptions of common points with other embodiments will be omitted below.

The evaluation device 5 includes an information acquirer 51, a calculator 52, and a display data generator 53.

The information acquirer 51 acquires, from the search engine 1, one or more web pages that comes up for a target search query, one or more words contained in each of the web pages, and the number of times each word is used in each web page. In addition, the information acquirer 51 acquires content contained in the one or more web pages and the degree thereof (this point is as described in the second embodiment and the like).

FIG. 27A is a diagram schematically showing information acquired by the information acquirer 51 when the target search query is "AI". Note that "AI" is an abbreviation for "artificial intelligence", and it is assumed that there is a singer named "AI". It can be said that the search needs of "artificial intelligence" and "singer" are mixed for the search target query "AI". To simplify the description, it is assumed that there are two web pages, W1 and W2, that comes up for "AI" (if there are many web pages, for example, a predetermined number of upper web pages may be adopted).

In the web page W1, the word "artificial intelligence" is used five times, the word "intelligence" is used four times, and the word "concert" is used once. As shown by the color bar, 95% of the content of the web page W1 is "artificial intelligence" and 5% is "singer".

Meanwhile, in the web page W2, the word "artificial intelligence" is used once, and the word "concert" is used four times. As shown by the color bar, 10% of the content of the web page W2 is "artificial intelligence" and 90% is "singer".

As described above, it can be said that the words "artificial intelligence", "intelligence", and "concert" all contain "artificial intelligence" and "singer" as the content (context). In addition, it can also be said that these words include "artificial intelligence" and "singer" as the needs.

Another example will be shown. FIG. 27B is a diagram schematically showing information acquired by the information acquirer 51 when the target search query is "storage". Note that it is assumed that in "storage", the needs of "warehouse facility" and the needs of "data storage means" are mixed. To simplify the description, it is assumed that there are two web pages, W1 and W2, that comes up for "storage" (if there are many web pages, for example, a predetermined number of upper web pages may be adopted).

In the web page W1, the word "storage" is used five times, the word "address" is used four times, and the word "TB" is used zero times. As shown by the color bar, 95% of the content of the web page W1 is "warehouse facility", and 5% is "data storage means".

Meanwhile, in the web page W2, the word "storage" is used three times, the word "address" is used zero times, and the word "TB" is used ten times. As shown by the color bar, 10% of the content of the web page W2 is "warehouse facility", and 90% is "data storage means".

As described above, the words "storage", "address", and "TB" are considered to be expressions that satisfy different needs because different webpage content leads to a change in frequency of use.

Returning to FIG. 26, the calculator 52 calculates the degree of the content of each word according to the number of times the word is contained in the web page and the degree of the content contained in the web page.

As a simple calculation method, when a word is used Ni times in a web page Wi (i=1 to n) and the degree of the content C of the web page Wi is Pi, the calculator 52 can calculate the degree R of the content C in the word by Formula (5).

[Formula 5]

$$R = \sum_{i=1}^{n} Ni * Pi \tag{5}$$

In the example of FIG. 27A, the degree of the content "artificial intelligence" in the word "artificial intelligence" is $5*0.95+1*0.1=4.85$. The degree of the content "singer" in the word "artificial intelligence" is $5*0.05+1*0.9=1.15$. FIG. 28A shows the result of similar calculations for other words "intelligence" and "concert".

More generally, the calculator 52 can calculate the degree R of the content of a word based on Formula (6).

[Formula 6]

$$R = \sum_{i=1}^{n} s(N_i)(v_i + A) \begin{pmatrix} c_{ia} \\ c_{ib} \\ c_{ic} \\ \vdots \end{pmatrix} \tag{6}$$

Here, Ni (i=1 to n) is the number of times the word is used in the web page Wi. s (Ni) is a function monotonically increasing with respect to Ni. For example, the function may be s (Ni)=Ni, or a logarithmic function of s (Ni) may be used to prevent the influence of the large number of times of use from becoming too large. A is a constant and vi is the weight of the web page Wi. The weight vi may be a constant, or may be set larger as the number of inflows or the acquired economic scale increases. Cia, Cib, Cic, . . . are the degree of content a, b, c . . . in the web page Wi, respectively. Formula (5) is obtained by setting s (Ni)=Ni and vi=1 in Formula (6).

Figure 28B:
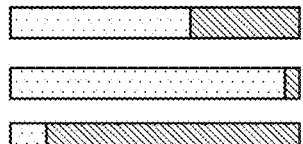
FIG. 28B is a diagram showing one example of the screen displayed on the display 33.

Returning to FIG. 26, the display controller 53 displays the content and the degree thereof in association with each word. The display mode may be any format, such as a tabular format as shown on the left side of FIG. 28A, or the color bar format shown on the right side of the figure. Note that FIG. 28B corresponds to FIG. 27A.

As described in the second embodiment with reference to FIG. 14A and the like, the user can preferably perform filtering and sorting by using color bar information.

For example, FIG. 28 shows that, when the target is "artificial intelligence", the web page creator whose target search query is "AI" preferably contains "artificial intelligence" and "intelligence" in the web page. While FIGS. 27A and 28 are simplified examples, there are usually many words associated with target search queries. Even in such a case, as shown in FIG. 28, by displaying the content contained in each word and the degree thereof in association with each word, it is possible to quickly determine the word to be contained according to the content of the web page to be created (and thus what kind of content based on the word).

Seventh Embodiment

Since search needs change from moment to moment, the above-described evaluation of the web page and the like also changes as the search needs change. Each embodiment described above can display various evaluations on the display. However, if the site administrator checks the change in the search needs and the like only with the evaluation (index) on the display, the check needs man-hours, there is a risk of delay until checking on the display and omission in the check, and there is a risk that many web pages within the website do not respond to the change in the search needs.

Therefore, the seventh embodiment notifies a user when a specified condition designated by the user is satisfied.

Figure 29:
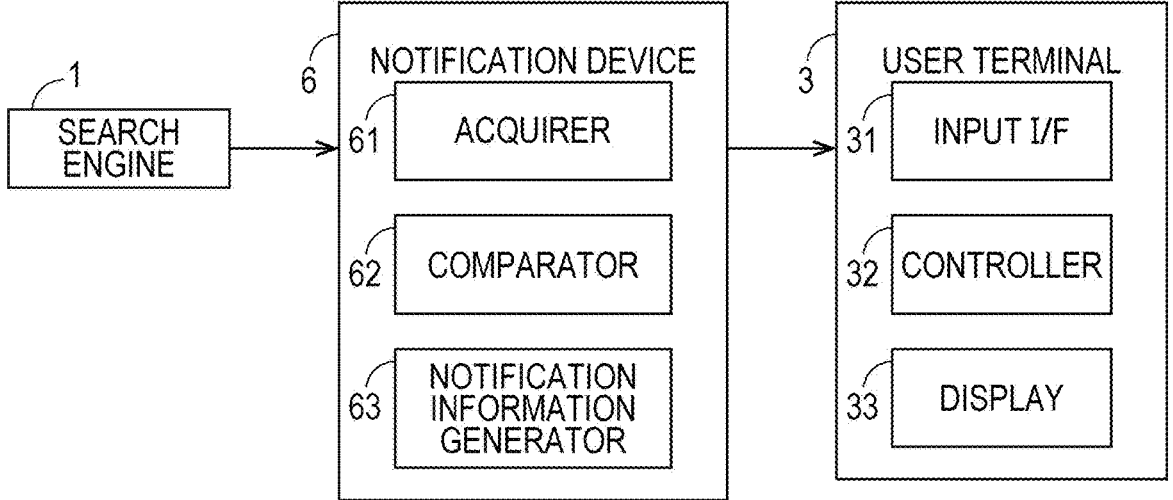
FIG. 29 is a block diagram showing a schematic configuration of a notification system according to a seventh embodiment.

FIG. 29 is a block diagram showing a schematic configuration of a notification system according to the seventh embodiment. Since each of the above-described embodiments can be applied to the present embodiment, duplicate descriptions will be omitted.

The notification system includes a search engine 1, a notification device 6, and a user terminal 3. The notification device 6 includes an acquirer 61, a comparator 62, and a notification information generator 63.

The acquirer 61 acquires a monitoring target value designated by the user. The monitoring target value may be an arbitrary parameter that fluctuates depending on search trends, and is, for example, proportion of a specified search need in a specified search query, estimated amount of inflow of specified search needs in a specified search query, acquired economic scale of specified search needs in a specified search query, or needs purity of a specified search query.

The acquirer 61 may acquire the monitoring target value from the search engine 1. Alternatively, the acquirer 61 may acquire search data from the search engine 1 and calculate the monitoring target value based on the search data. The acquirer 61 preferably acquires data from the search engine 1 as frequently as possible.

The comparator 62 compares the monitoring target value with a reference value. The reference value is one threshold, and the comparator 62 may compare the monitoring target value with the reference value. Alternatively, the reference value is a range with upper and lower limits, and the comparator 62 may compare the monitoring target value with the upper limit and compare the monitoring target value with the lower limit. The reference value (threshold, upper limit, lower limit) may be fixed values determined in advance, or may be arbitrarily set by the user.

The notification information generator 63 generates notification information according to the comparison result by the comparator 62. For example, the notification information generator 63 may generate the notification information when the monitoring target value exceeds or falls short of the threshold. Alternatively, the notification information generator 63 may generate the notification information when the monitoring target value enters or exits a range having upper and lower limits.

Then, the notification information is transmitted from the notification information generator 63 to the user terminal 3. As a specific method for notifying the user, the notification may be displayed on the display 33, an email including the notification may be transmitted to the user terminal 33, and a push notification may be sent to an application installed in the user terminal 3 (SNS application or the like).

As described above, the present embodiment can monitor the monitoring target value and automatically notify the user when this value fluctuates significantly due to a change in search trends or the like.

The above-described embodiments are described for the purpose of enabling a person having ordinary knowledge in the technical field to which the present invention belongs to implement the present invention. Various modifications of the embodiments can be naturally made by those skilled in the art, and the technical idea of the present invention can also be applied to other embodiments. Therefore, the present invention should not be limited to the described embodiments, but should have the broadest scope in accordance with the technical idea defined by the claims.

REFERENCE SIGNS LIST 1 search engine
2 search needs evaluation device
21 search needs acquirer
22 display data generator
3 user terminal
31 input interface
32 controller
33 display
4 web page evaluation device
4' website evaluation device
41 content acquirer
42 display data generator
43 adder
5 evaluation device
51 information acquirer
52 adder
53 display data generator
6 notification device

61 acquirer
62 comparator
63 notification information generator
The invention claimed is:

1. A non-transitory computer-readable medium storing a search needs evaluation program that causes at least one processor to:
  acquire one or more search needs included in an evaluation target search query, a degree of the one or more search needs and a needs purity of the one or more search needs; and
  generate display data for displaying the search needs included in the evaluation target search query and the degree of the one or more search needs and the needs purity of the one or more search needs in association with the evaluation target search query,
  wherein the needs purity of the one or more search needs is an index indicating a degree of variation in the one or more search needs included in the evaluation target search query.

2. A non-transitory computer-readable medium storing a search needs evaluation program that causes at least one processor to:
  acquire one or more search needs included in each of a plurality of evaluation target search queries and a degree of the one or more search needs; and
  generate display data for, only for a specific evaluation target search query specified based on a search need designated from a user, displaying the search needs included in the specific evaluation target search query and the degree of the one or more search needs in association with the specific evaluation target search query.

3. The non-transitory computer-readable medium according to claim 2, wherein generating the display data comprises generate the display data for, only for the specific evaluation target search query specified based on the search needs and the degree of the one or more search needs designated from a user, displaying the search needs included in the specific evaluation target search query and the degree of the one or more search needs in association with the specific evaluation target search query.

4. A non-transitory computer-readable medium storing a search needs evaluation program that causes at least one processor to:
  acquire one or more search needs included in an evaluation target search query and a degree of the one or more search needs; and
  generate display data for displaying information, in association with the evaluation target search query, the search needs included in the evaluation target search query and the degree of the one or more search needs, and at least one of a number of searches of the evaluation target search query, a number of inflows of the evaluation target search query, or economic scale of the evaluation target search query.

5. A non-transitory computer-readable medium storing a search needs evaluation program that causes at least one processor to:
  acquire one or more search needs included in each of a plurality of search queries included in a search query group and a degree of the one or more search needs;
  acquire the degree of each of the search needs included in the search query group by weighting and adding the degree of the search needs included in each of the plurality of search queries according to the number of inflows of the search query or economic scale, and generate display data for displaying the acquired degree of each of the search needs in association with the search query group.

6. The non-transitory computer-readable medium according to claim 2, wherein
  acquiring the search needs comprises acquire a needs purity of the search needs in addition to the degree of the one or more search needs,
  generating the display data comprises generate the display data for displaying the needs purty in addition to the degree of the one or more search needs, and
  the needs purity is an index indicating a degree of variation in the search needs included in the evaluation target search query.

7. The non-transitory computer-readable medium according to claim 1, wherein the search needs are obtained by
  converting at least one of a content and a structure of each of a plurality of web pages included in a search result for the evaluation target search query into a multi-dimensional feature vector, and
  classifying the plurality of web pages into a plurality of subsets each of which corresponds to a search need based on the feature vector.

8. A search needs evaluation method performed by at least one processor, the method comprising:
  acquiring one or more search needs included in an evaluation target search query, a degree of the one or more search needs and a needs purity of the one or more search needs; and
  generating display data for displaying the search needs included in the evaluation target search query and the degree of the one or more search needs and the needs purity of the one or more search needs in association with the evaluation target search query,
  wherein the needs purity of the one or more search needs is an index indicating a degree of variation in the one or more search needs included in the evaluation target search query.

9. A search needs evaluation device comprising:
  a search needs acquisition means configured to acquire one or more search needs included in an evaluation target search query, a degree of the one or more search needs and a needs purity of the one or more search needs; and
  a display data generation means configured to generate display data for displaying the search needs included in the evaluation target search query and the degree of the one or more search needs and the needs purity thereof in association with the evaluation target search query,
  wherein the needs purity of the one or more search needs is an index indicating a degree of variation in the one or more search needs included in the evaluation target search query.

10. A search needs evaluation method performed by at least one processor, the method comprising:
  acquiring one or more search needs included in each of a plurality of evaluation target search queries and a degree of the one or more search needs; and
  generating display data for, only for a specific evaluation target search query specified based on a search need designated from a user, displaying the search needs included in the specific evaluation target search query and the degree of the one or more search needs in association with the specific evaluation target search query.

11. A search needs evaluation device comprising:

a search needs acquisition means configured to acquire one or more search needs included in each of a plurality of evaluation target search queries and a degree of the one or more search needs; and a display data generation means configured to generate display data for, only for a specific evaluation target search query specified based on a search need designated from a user, displaying the search needs included in the specific evaluation target search query and the degree of the one or more search needs in association with the specific evaluation target search query.

12. A search needs evaluation method performed by at least one processor, the method comprising:

acquiring one or more search needs included in an evaluation target search query and a degree of the one or more search needs; and generating display data for displaying information, in association with the evaluation target search query, the search needs included in the evaluation target search query and the degree of the one or more search needs, and at least one of a number of searches of the evaluation target search query, a number of inflows of the evaluation target search query, or economic scale of the evaluation target search query.

13. A search needs evaluation device comprising:

a search needs acquisition means configured to acquire one or more search needs included in an evaluation target search query and a degree of the one or more search needs; and a display data generation means configured to generate display data for displaying information, in association with the evaluation target search query, the search needs included in the evaluation target search query and the degree of the one or more search needs, and at least one of a number of searches of the evaluation target search query, a number of inflows of the evaluation target search query, or economic scale of the evaluation target search query.

14. A search needs evaluation method performed by at least one processor, the method comprising:

acquiring one or more search needs included in each of a plurality of search queries included in a search query group and a degree of the one or more search needs;

acquiring the degree of each of the search needs included in the search query group by weighting and adding the degree of the search needs included in each of the plurality of search queries according to the number of inflows of the search query or economic scale, and generating display data for displaying the acquired degree of each of the search needs in association with the search query group.

15. A search needs evaluation device comprising:

a search needs acquisition means configured to acquire one or more search needs included in each of a plurality of search queries included in a search query group and a degree of the one or more search needs;

a display data generation means configured to acquire the degree of each of the search needs included in the search query group by weighting and adding the degree of the search needs included in each of the plurality of search queries according to the number of inflows of the search query or economic scale, and generate display data for displaying the acquired degree of each of the search needs in association with the search query group.

16. A non-transitory computer-readable medium storing a notification program that causes at least one processor to:

acquire a monitoring target value;

compare the monitoring target value with a reference value; and in response to varying the monitoring target value over the reference value, generate notification information according to a comparison result, wherein the monitoring target value is:

a proportion of a certain search need to a certain search query, an estimated amount of inflow of a certain search need in a certain search query, an acquired economic scale of a certain search need in a certain search query, or a need purity indicating a degree of variation in a search needs included in the certain search query.

17. The non-transitory computer-readable medium according to claim 16, wherein the monitoring target value is acquired from a search engine.

18. A notification device comprising:

an acquisition means configured to acquire a monitoring target value;

a comparison means configured to compare the monitoring target value with a reference value; and a notification information generation means configured to, in response to varying the monitoring target value over the reference value, generate notification information according to a comparison result, wherein the monitoring target value is:

a proportion of a certain search need to a certain search query, an estimated amount of inflow of a certain search need in a certain search query, an acquired economic scale of a certain search need in a certain search query, or a need purity indicating a degree of variation in a search needs included in the certain search query.

19. A notification method performed by at least one processor, the method comprising:

acquiring a monitoring target value;

comparing the monitoring target value with a reference value; and in response to varying the monitoring target value over the reference value, generating notification information according to a comparison result, wherein the monitoring target value is:

a proportion of a certain search need to a certain search query, an estimated amount of inflow of a certain search need in a certain search query, an acquired economic scale of a certain search need in a certain search query, or a need purity indicating a degree of variation in a search needs included in the certain search query.

* * * * *